(12) United States Patent
Berghoff et al.

(10) Patent No.: US 7,013,932 B2
(45) Date of Patent: Mar. 21, 2006

(54) AUTOMATIC PORTION CONTROL SYSTEM USING STRAIN GAUGE TECHNOLOGY

(75) Inventors: Chris Berghoff, Shorewood, MN (US); Gary R L Olson, Belle Plaine, MN (US); Sean Theisen, Minneapolis, MN (US)

(73) Assignee: Control Products, Inc., Chanhassen, MN (US)

( * ) Notice: Subject to any disclaimer, the term of this patent is extended or adjusted under 35 U.S.C. 154(b) by 0 days.

(21) Appl. No.: 10/774,953

(22) Filed: Feb. 9, 2004

(65) Prior Publication Data

US 2004/0256022 A1 Dec. 23, 2004

Related U.S. Application Data

(63) Continuation of application No. 10/235,386, filed on Sep. 5, 2002, now abandoned, which is a continuation of application No. 09/691,366, filed on Oct. 18, 2000, now abandoned.

(60) Provisional application No. 60/159,581, filed on Oct. 18, 1999.

(51) Int. Cl.
*B65B 1/30* (2006.01)
(52) U.S. Cl. .......................................... 141/83; 141/95
(58) Field of Classification Search .................. 141/2, 141/18, 83, 94, 95; 177/52
See application file for complete search history.

(56) References Cited

U.S. PATENT DOCUMENTS

| 4,789,016 A | * | 12/1988 | Mihail ......................... 141/143 |
| 5,515,888 A | * | 5/1996 | Graffin ........................... 141/1 |
| 6,220,312 B1 | * | 4/2001 | Hirsch et al. .................. 141/83 |

* cited by examiner

*Primary Examiner*—Timothy L. Maust
(74) *Attorney, Agent, or Firm*—Skinner and Associates

(57) ABSTRACT

An automatic portion control system, comprising: a dispensing mechanism adapted for dispensing a first substance into a container; a scale adapted for weighing said container; and control circuitry adapted for reading a container weight from said scale and controlling said dispensing mechanism accordingly. The invention further comprises a method for dispensing a product into a container, comprising the steps of: weighing a container; and dispensing the product into the container until reaching the estimated filled weight of the container.

8 Claims, 52 Drawing Sheets

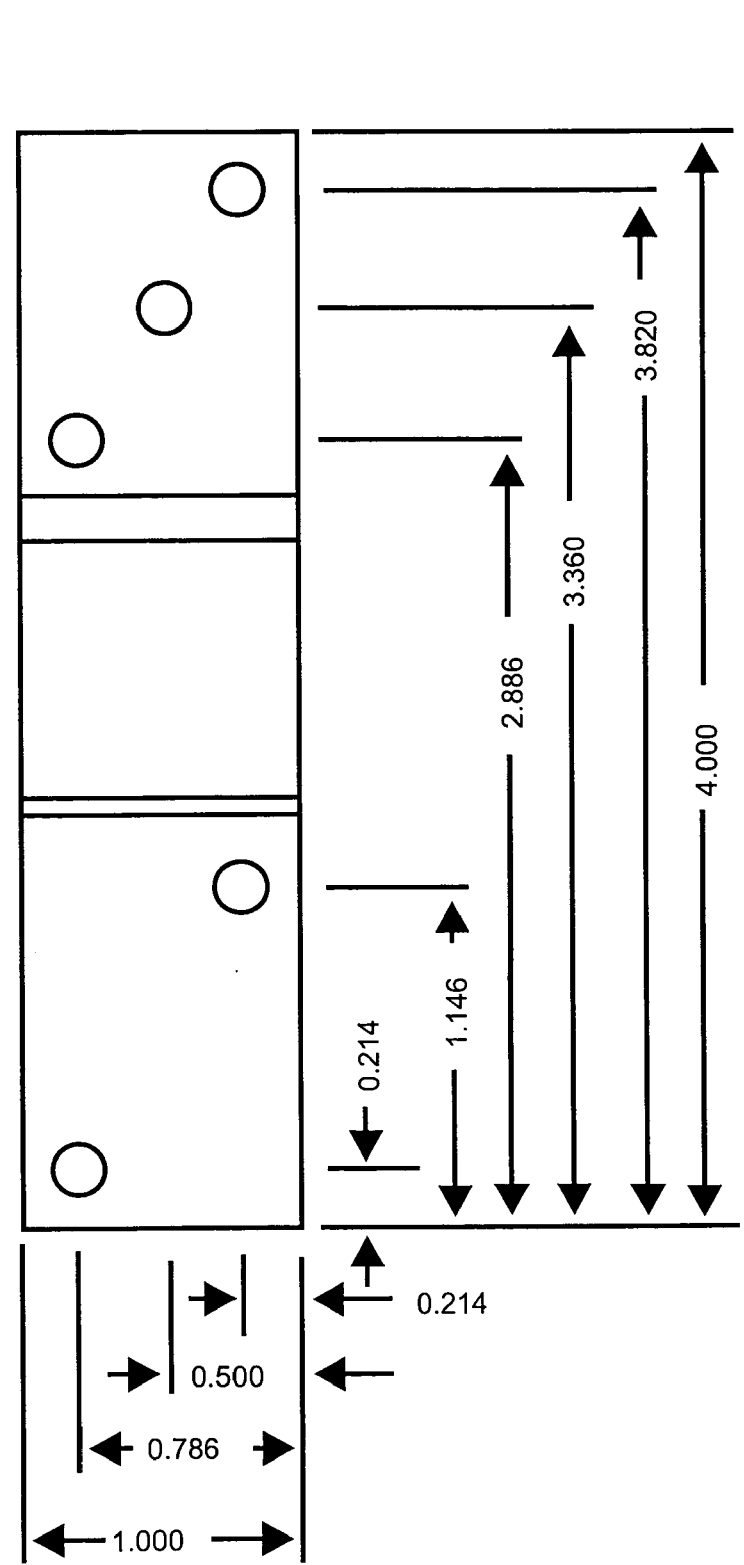

FIG. 2

SURFACE TOP AND BOTTOM TO BE SMOOTH AND FREE OF MACHINING MARKS AND RIDGES.

0.175 RADIUS FOUR (4) PLACES

DRILL TWO (2) HOLES 0.500 DIAMETER. HOLES WILL OVERLAP

16

1.900

2.100

LOAD CELL
SIDE VIEW

LOAD CELL SIDE VIEW

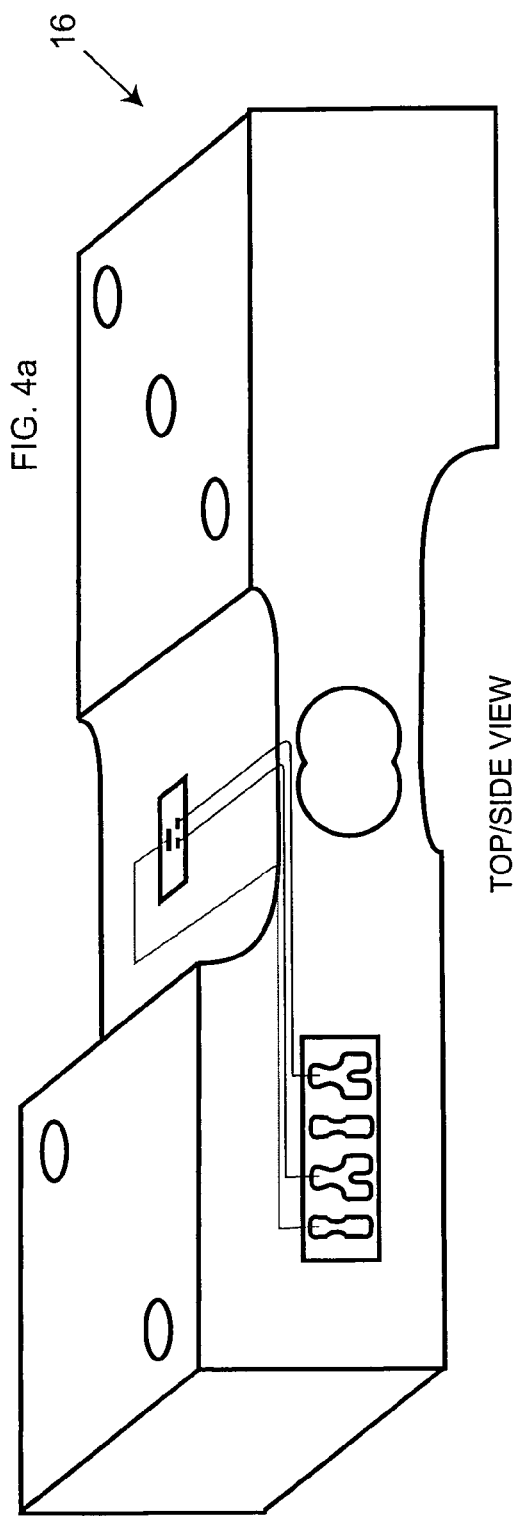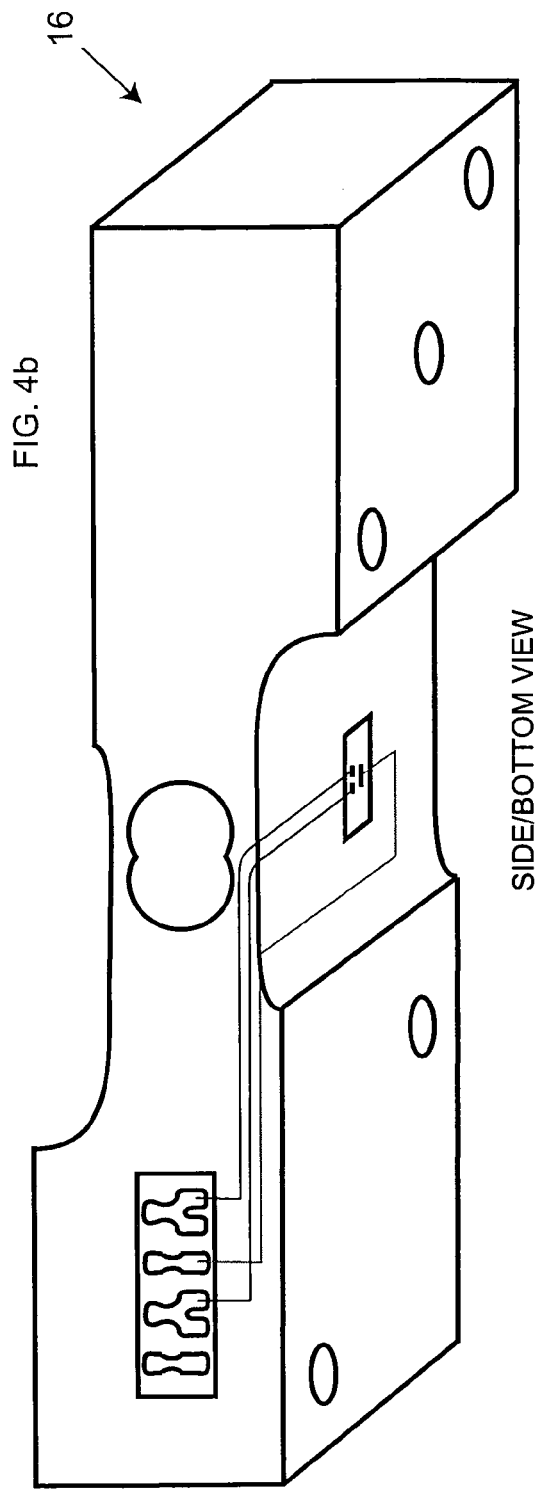

FIG. 5a
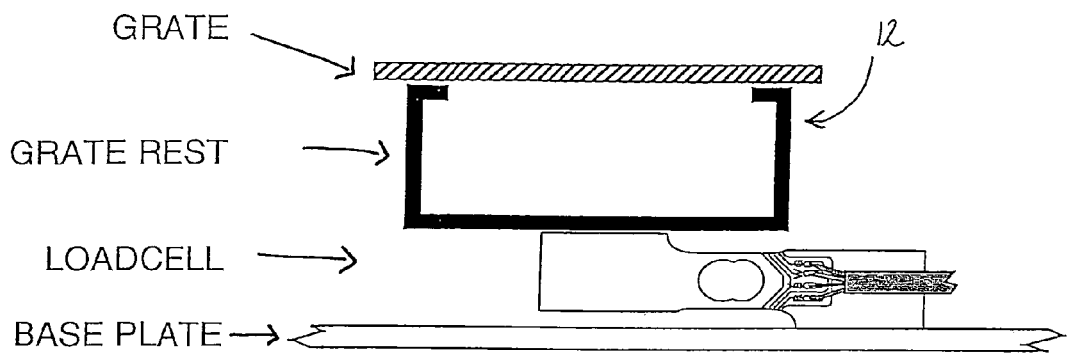
GRATE
GRATE REST
LOADCELL
BASE PLATE
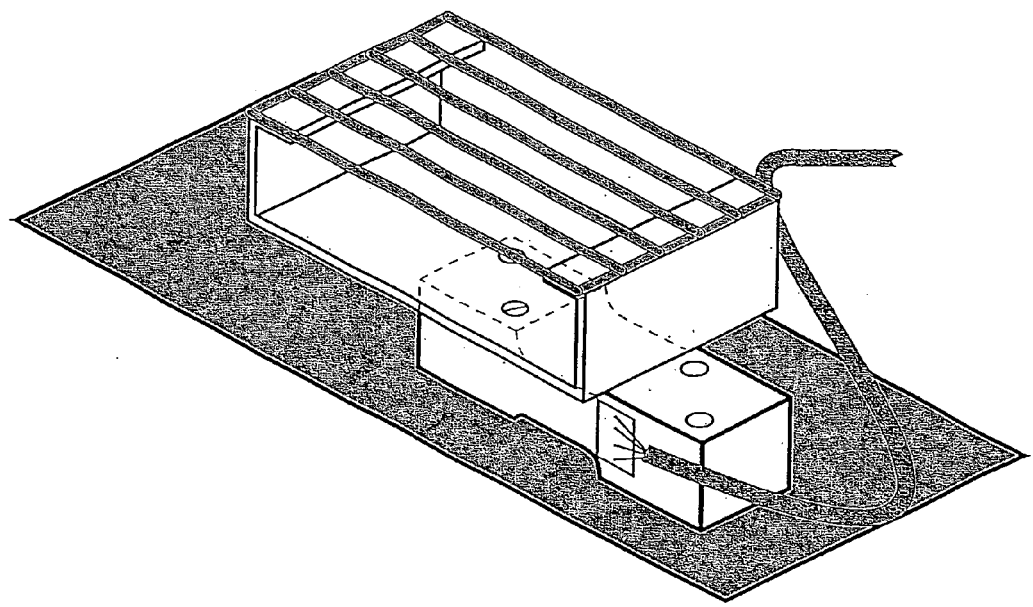

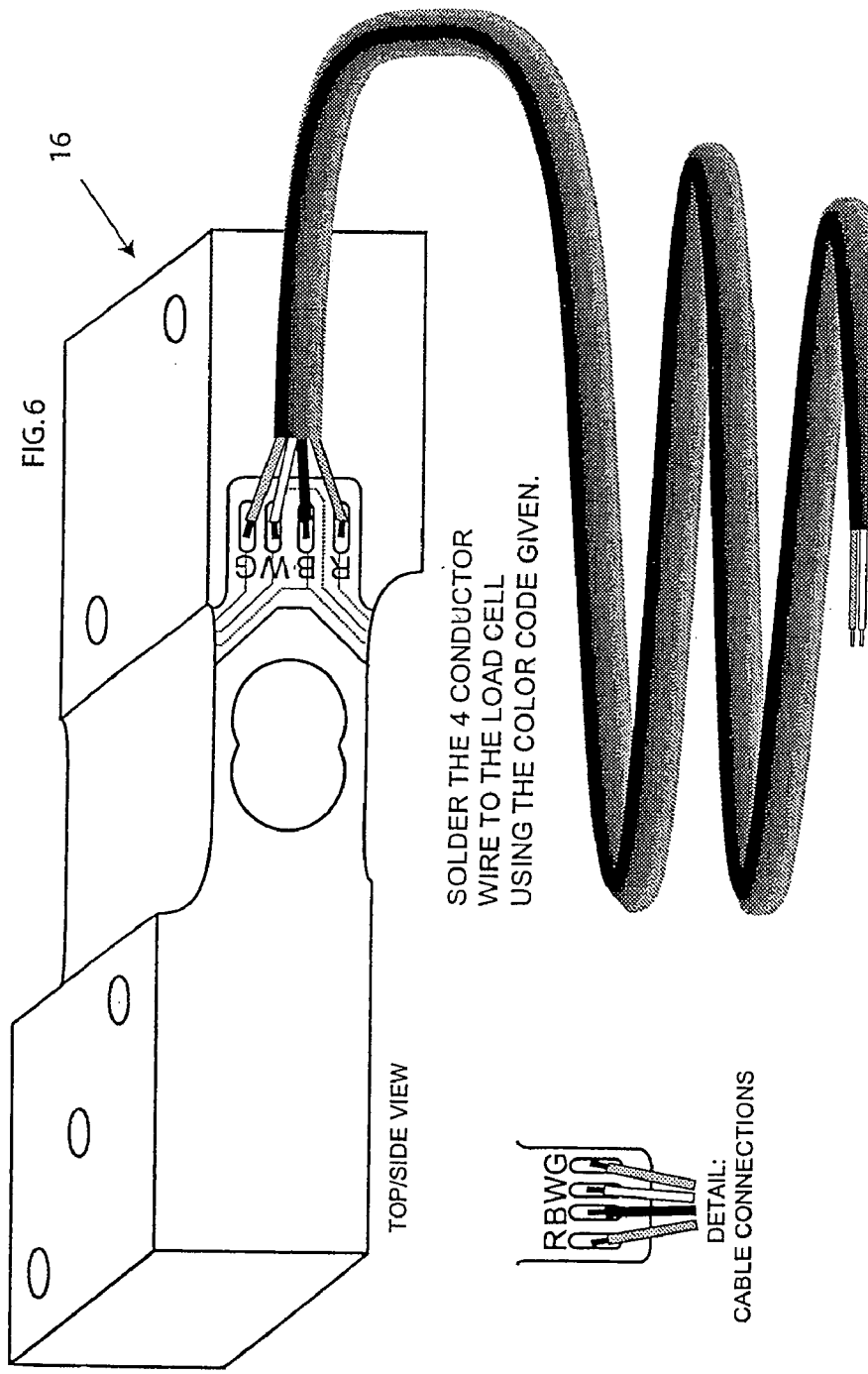

| FIG. 9A |
|---|
| FIG. 9B |
| FIG. 9C |
| FIG. 9D |
| FIG. 9E |
| FIG. 9F |
| FIG. 9G |
| FIG. 9H |
| FIG. 9I |
| FIG. 9J |
| FIG. 9K |
| FIG. 9L |
| FIG. 9M |
| FIG. 9N |
| FIG. 9O |
| FIG. 9P |
| FIG. 9Q |
| FIG. 9R |

FIG. 9

| FIG. 9J-1 |
|---|
| FIG. 9J-2 |
| FIG. 9J-3 |
| FIG. 9J-4 |
| FIG. 9J-5 |

| SPARE GATE TABLE |||
|---|---|---|
| LAST USED | NOT USED | SPARE GATES |
| BZ1 | | |
| C22 | | |
| D18 | D5, D6, D7, D8, D10 | |
| J36 | J4 | |
| K8 | | |
| L1 | | |
| MOV1 | | |
| PB2 | | |
| Q1 | | |
| R76 | | |
| S1 | | |
| U15 | | U10:B, U10:C, U10:D |
| X1 | | |

| POWER TABLE |||||||||
|---|---|---|---|---|---|---|---|
| REF DES | DEVICE (TYPE) | PACKAGE | VCC | GND | +5V | GNDA | +12V |
| U1 | LM2576, STAG | TO-220, 5PIN | | 3,5 | | | |
| U2 | LM7805CT | TO-220(LP) | 3 | 2 | | | 1 |
| U3 | LM7805CT | PLCC44 PIC16F874 | | 2 | 3 | | 1 |
| U4 | PIC16F874/L PLCC | SO8 | 12,35 | 11,13,34 | | | |
| U5 | TLC277CD | SO8 | | | | 4 | 8 |
| U6 | TLC277CD | SO8 | | | | 4 | 8 |
| U7 | TLC277CD | SO8 | | | | 4 | 8 |
| U8 | TLC277CD | SO16 | | | | 4 | 8 |
| U9 | CD4051 | SO14 | 16 | | | 6,7,8 | |
| U10 | LM324M | DIP18 | | | | 11 | 4 |
| U11 | ULN2803A | SO16 | | 9 | | | 10 |
| U12 | 4052 | SO16 | 16 | 7,8,6 | | | |
| U13 | 4052 | SO16 | 16 | 7,8,6 | | | |
| U14 | 4052 | SO16 | 16 | 7,8,6 | | | |
| U15 | 4052 | SO16 | 16 | 7,8,6 | | | |

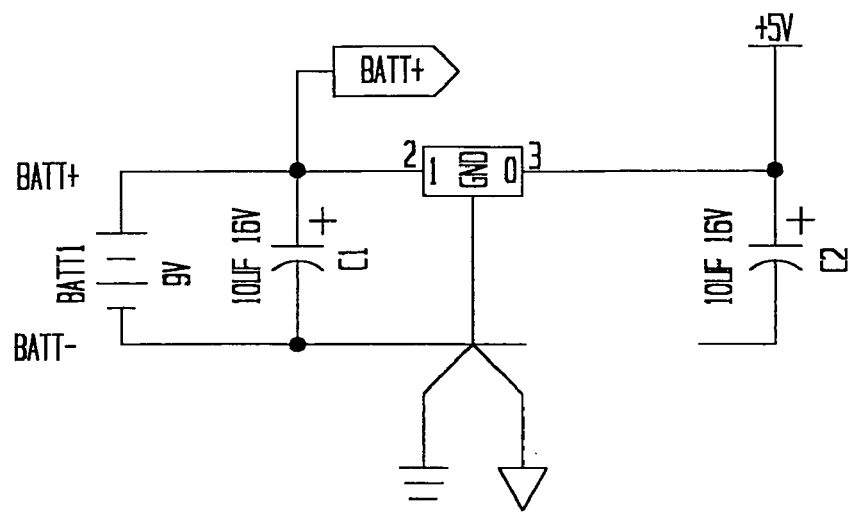
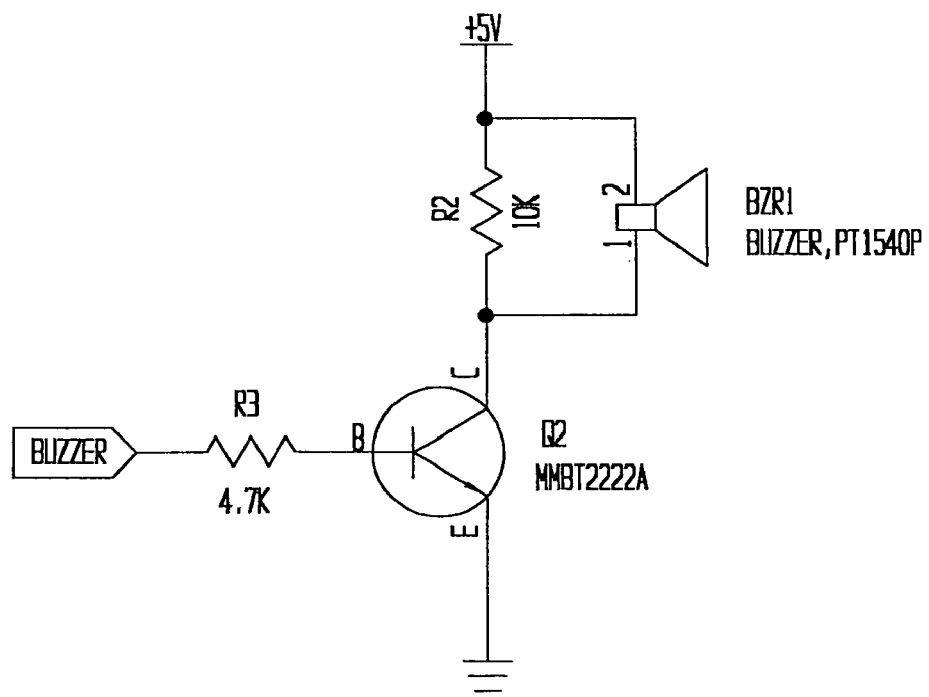
FIG. 10E

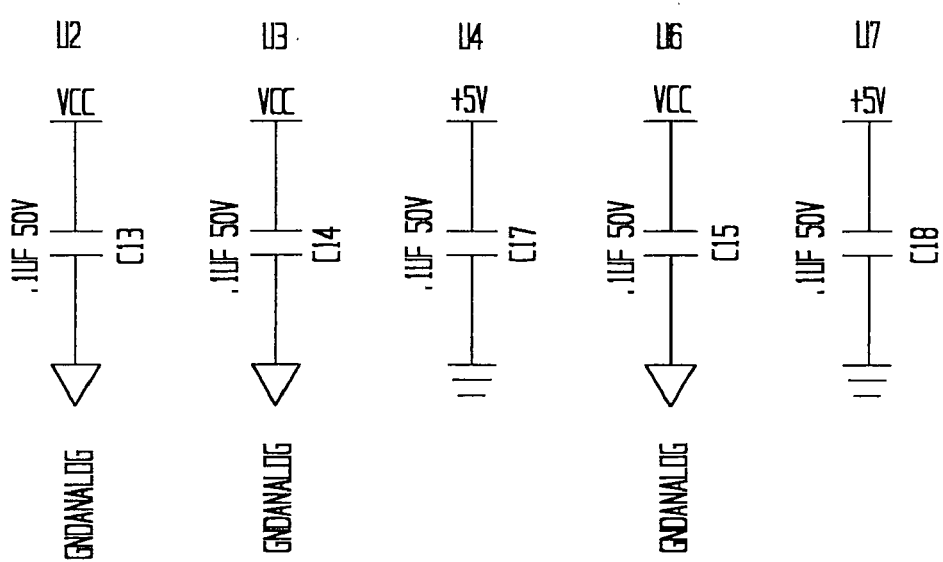
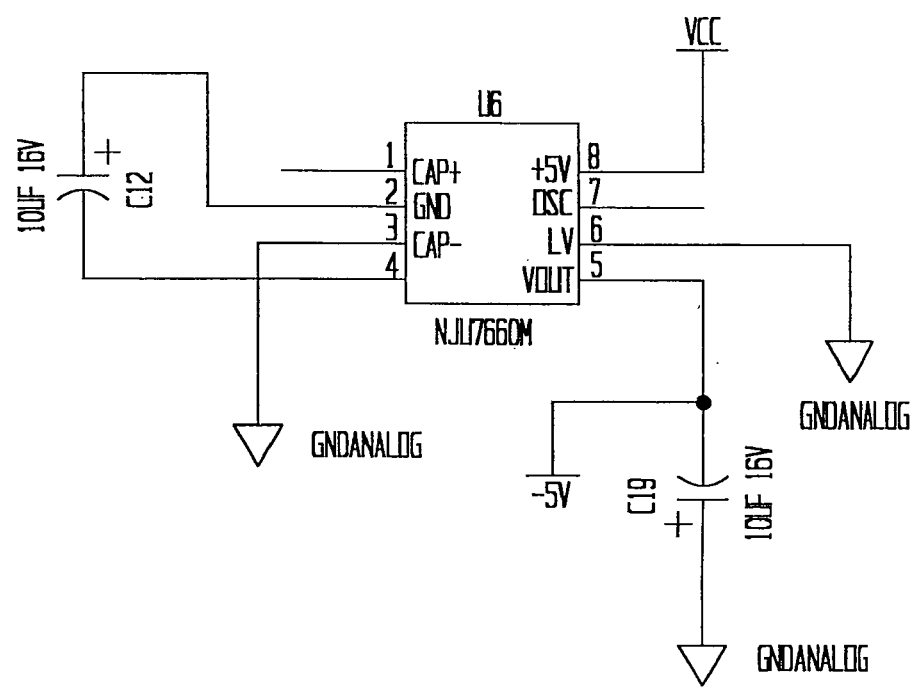
FIG. 10F

AUTOMATIC PORTION CONTROL SYSTEM USING STRAIN GAUGE TECHNOLOGY

CROSS-REFERENCE TO RELATED APPLICATIONS, IF ANY

This application is a continuation of U.S. patent application Ser. No. 10/235,386, filed Sep. 5, 2002, now abandoned, which is a continuation of U.S. patent application Ser. No. 09/691,366, filed Oct. 18, 2000, now abandoned, which claims the benefit under 35 U.S.C. §119(e) of co-pending U.S. Provisional Patent Application Ser. No. 60/159,581, filed Oct. 18, 1999, which are hereby incorporated by reference.

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to automatic portion control systems, including apparatus and methods. More particularly, the invention relates to apparatus and methods for providing automatic portion control using strain gauge technology.

2. Background Information

Automatic portion control problems include: (1) determining the volume of a substance that should be automatically dispensed into a container that already contains an undetermined volume of another substance, and (2) providing automatic portion control using dispensing equipment that has a varying flow rate.

The state of the art includes various apparatus and methods for providing automatic portion control. Where, for example, beverages are automatically dispensed into containers or cups that have a varying amount of pre-dispensed ice, ice cream, cream, or other substance, or are dispensed at an inconsistent rate due to varying line pressures, the beverages are dispensed using timed portion control or overflow conductivity methods.

Ultrasonic technology has been used to automatically control portion, wherein the level of a substance is determined by transmitting a signal downward into a receptacle and then receiving the reflected signal off of the surface of the substance.

External conductive probes also have been used to automatically control portion. The probes are positioned to detect when a container has filled or over-filled. The dispenser is deactivated when the overfill from the container forms a conductive path.

Time-based portion control technology dispenses a substance into a container for a pre-programmed sequence of one or more fill times for a given container size. A sequence may be programmed, for example, by recording the time on, time off, time on, etc. during a manual fill cycle.

These known apparatus and methods are believed to have significant limitations and shortcomings. Specifically, they may be inaccurate, waste product, cause a mess, and/or pose a contamination hazard.

The present invention provides an apparatus and method for providing automatic portion control which is believed to constitute an improvement over the known art. The present invention allows for more accurate automatic portion control regardless of the amount of substance that has already been placed into the container, provides accurate automatic portion control at varying flow rates, and provides accurate fill capacity without requiring an overflow to deactivate dispensing. Other advantages include the elimination of a path for product contamination, the minimization of product scrap, and the minimization of fill inaccuracies and messes that cause customer complaints.

BRIEF SUMMARY OF THE INVENTION

The present invention provides an apparatus and method for providing automatic portion control using strain gauge technology which provides a means to measure and control the portion of a dispensed product by measuring weight. Electronic circuitry deactivates the dispensing process upon reaching a desired weight. Using strain gauge technology allows multiple substances to be dispensed in an accurate, combined total portion without having to accurately measure the previous portions. For example, the present invention allows liquid to be accurately dispensed into a cup or pitcher that already has ice, regardless of the amount of ice that has already been placed into the container. It also provides accurate automatic portion control at varying flow rates and accurate fill capacity without having to overflow to deactivate dispensing.

The automatic portion control system generally comprises a dispensing mechanism adapted for dispensing a first substance into a container, a scale adapted for weighing the container, and control circuitry adapted for reading a container weight from the scale and controlling the dispensing mechanism accordingly. The scale preferably includes at least one strain gauge load cell. The control circuitry preferably includes a strain gauge amplifier portion and an A/D converter portion adapted for converting a voltage differential caused by a deflection of the strain gauge load cell into usable digital data. This A/D converter may be included as one of the features of a microcontroller unit or implemented as a stand-alone integrated circuit, which is integrated with the microcontroller. The control circuitry also includes a microprocessor adapted for reading a container weight from the scale and controlling the dispensing mechanism accordingly. A variety of controls may be used to operate and program the microprocessor. The weight detected by the microprocessor may be "zeroed" through a tare control, and multiple fill weights and foam delay times, or fill sequence, for a variety of containers may be pre-programmed. Additionally, the automatic portion control system may be used with small, medium, large, etc. selection switches, used with an auto-dispensing apparatus and method for dispensing a substance upon detecting a container weight to indicate the container's presence. The present invention may also be used with the "Apparatus and Method for Detecting An Object Using Digitally Encoded Optical Data," described in U.S. Pat. No. 5,902,998 and U.S. patent application Ser. No. 09/289,902 and herein incorporated by reference as Exhibit A and B, to detect the presence of a container and the container size and to initiate dispensing.

The present invention also includes a method for dispensing a product into a container, comprising the steps of weighing a container and dispensing the product into the container until reaching the estimated filled weight of the container. The method may further comprise the steps of detecting the presence of a container, detecting the type of container to determine the known empty weight and the known volume of an empty container, and/or performing a pre-programmed fill sequence. If the container contains an undetermined amount of a substance with a specific volume that is substantially different from that of the product, the step of dispensing the product into the container until reaching the estimated filled weight of the container may include the steps of subtracting the known empty weight from the current weight to determine the volume of a known substance in the container, and subtracting the volume of the substance in the container with the known volume of an empty container to determine the volume of product to dispense into the container.

The features, benefits and objects of this invention will become clear to those skilled in the art by reference to the following description, claims, if any, and drawings.

BRIEF DESCRIPTION OF THE SEVERAL VIEWS OF THE DRAWING

FIGS. 10a–f illustrate an electrical schematic of an alternative embodiment of the circuitry for the present invention.

DETAILED DESCRIPTION

Referring to FIGS. 1–11, an examplary embodiments of the present invention are illustrated.

The present invention provides an apparatus and method for providing automatic portion control using strain gauge technology which provides a means to measure and control the portion of a substance being dispensed by measuring weight. Upon reaching a desired weight, via possibly multiple fills/foam delays, the electronic circuitry deactivates the dispensing process. Using strain gauge technology allows multiple substances to be dispensed in an accurate, combined total portion without having to accurately measure the previous portions. For example, the present invention allows liquid to be accurately dispensed into a cup or pitcher that already has a volume of ice. The present invention provides more accurate automatic portion control regardless of the amount of substance that has already been placed into the container. It also provides accurate automatic portion control at varying flow rates and provides accurate fill capacity without having to overflow to deactivate dispensing.

The automatic portion control system generally comprises a dispensing mechanism adapted for dispensing a first substance into a container, a scale 12 adapted for weighing the container, and control circuitry 14 adapted for reading a container weight from the scale 12 and controlling the dispensing mechanism accordingly. The scale 12 preferably includes at least one strain gauge load cell 16 (see FIGS. 1–6).

Figure 3:
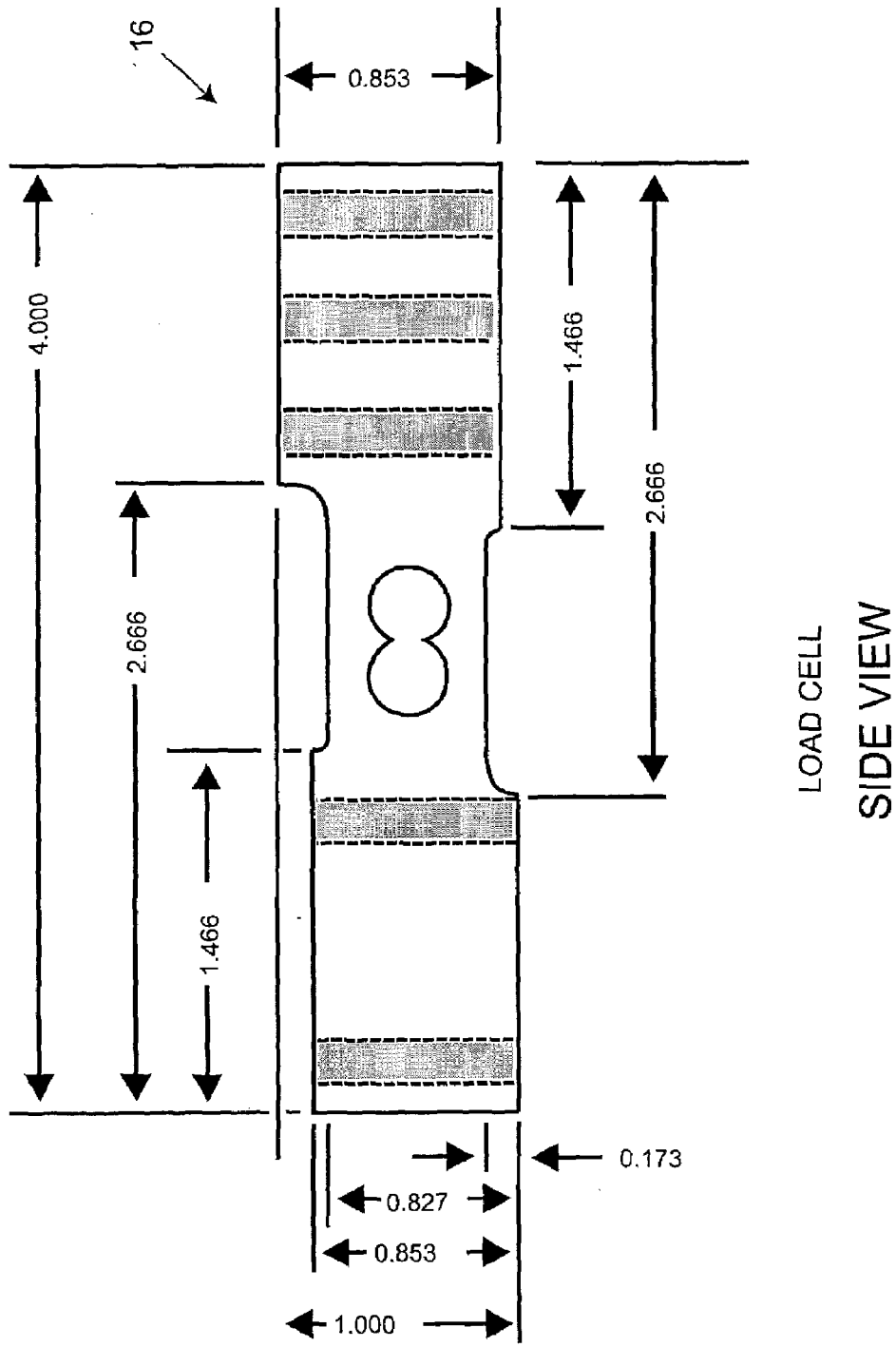
FIG. 3 is a side view of the load cell of FIG. 2 detailing the position of the drilled and tapped holes.
Figure 5B:
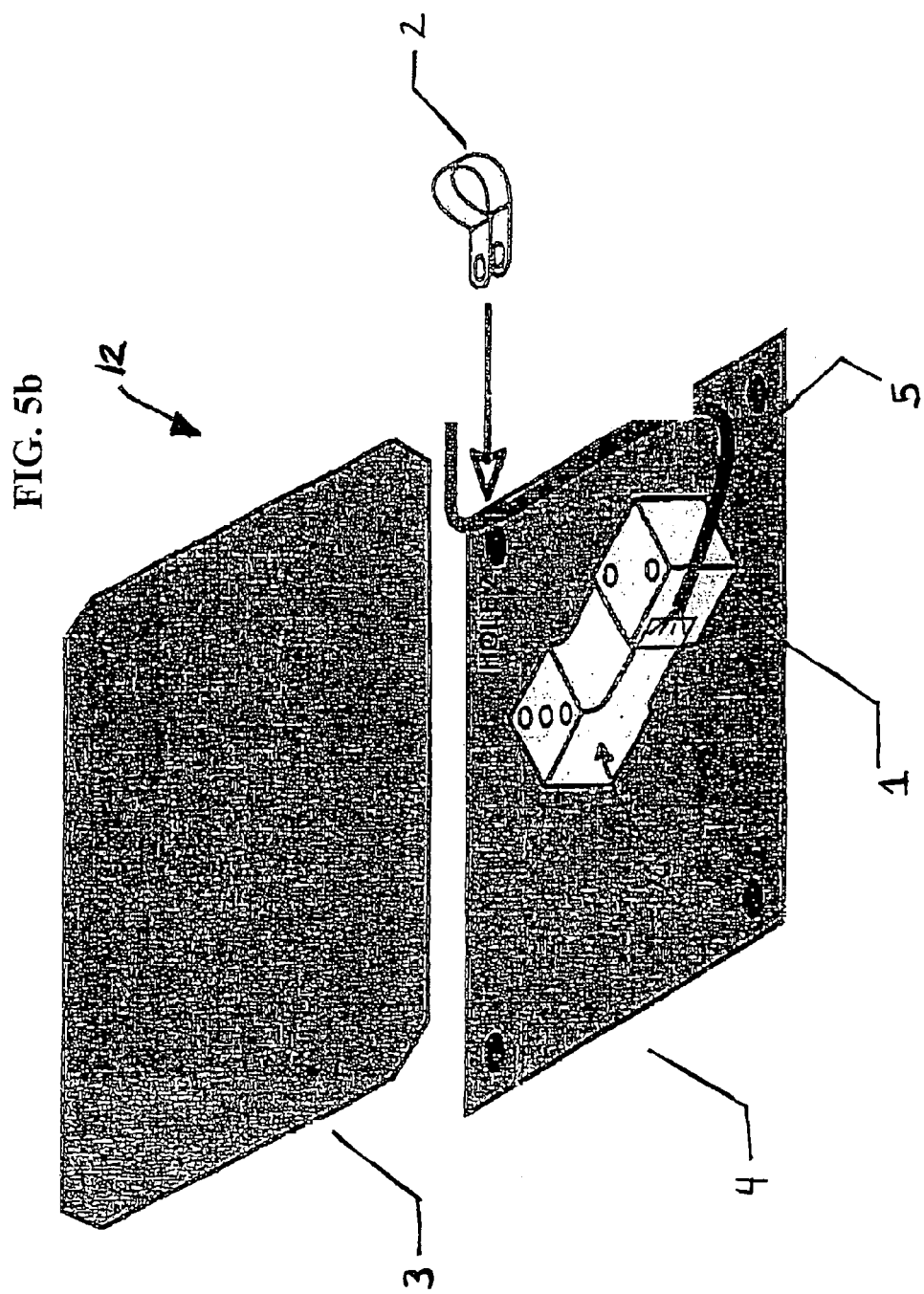
FIG. 5 is an illustration of a load cell strain gauge assembly positioned between a base plate and a weighing platform.
Figure 7A:
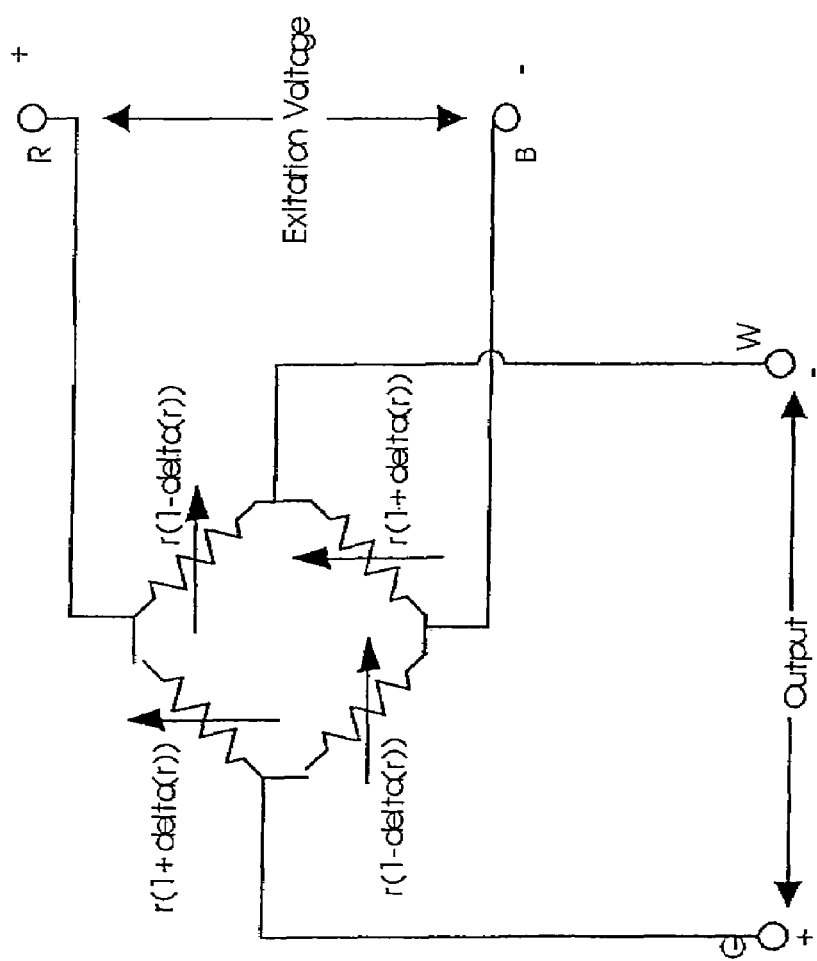
FIG. 7 is an electrical schematic view of the full bridge resistive load cell.
Figure 7B:
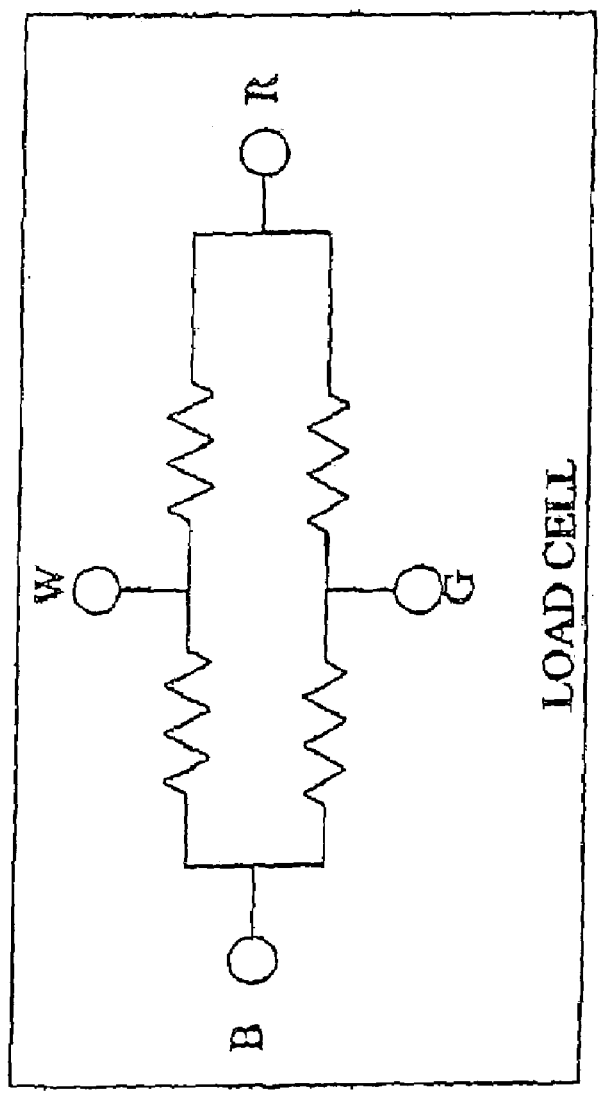
Figure 8A:
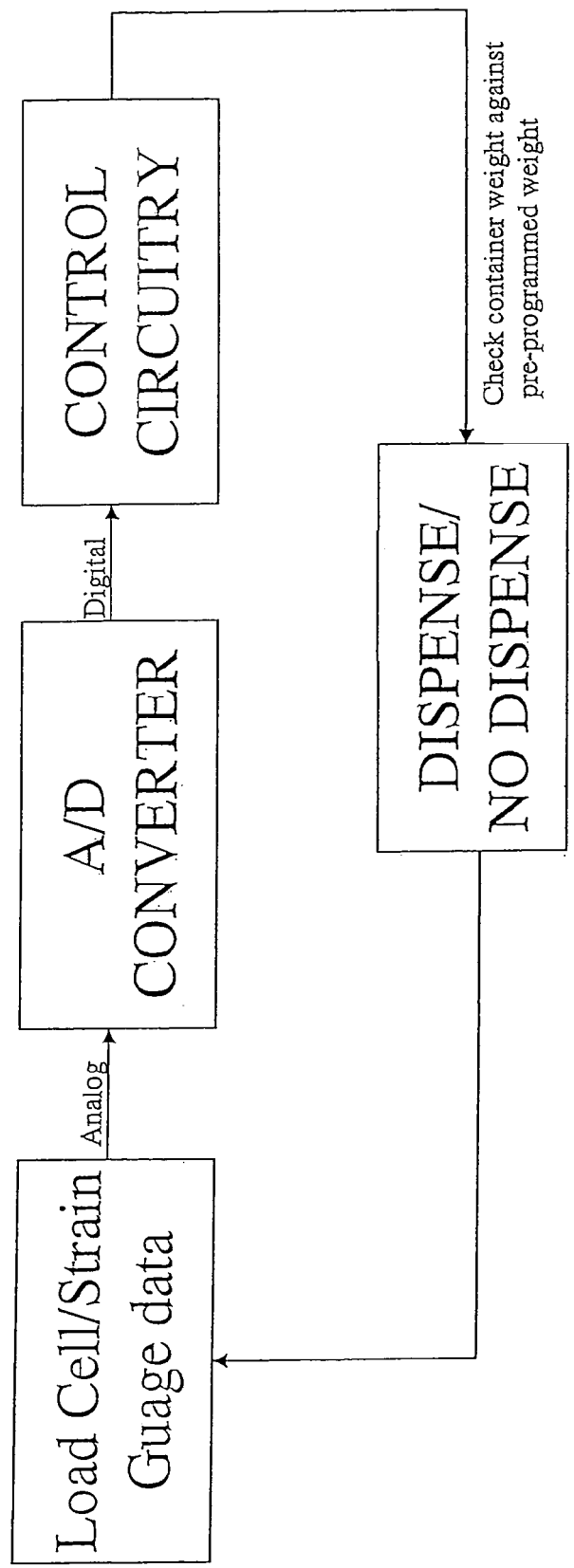
FIG. 8 is a block diagram illustrating the circuitry for the present invention.
Figure 8B:
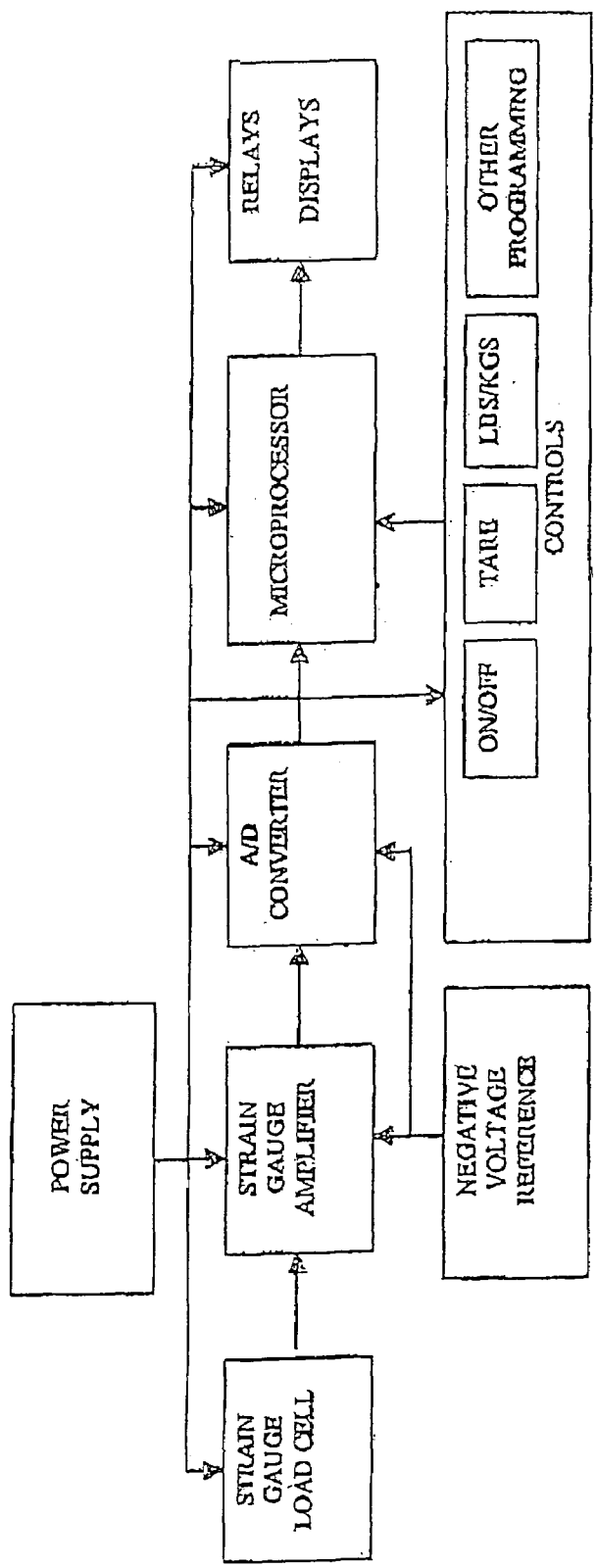
Figure 9A:
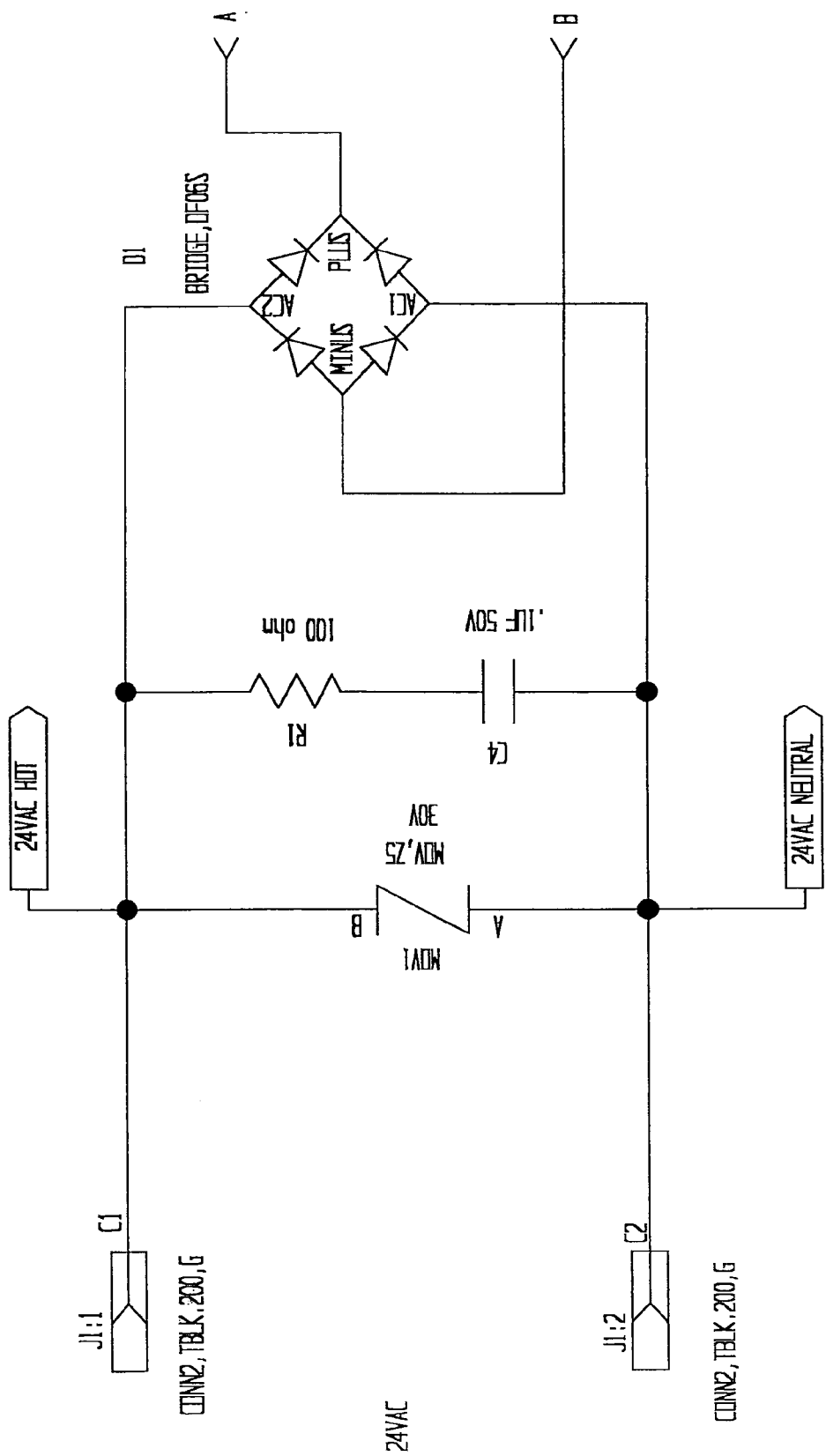
FIGS. 9a–r illustrate an electrical schematic of the circuitry for the present invention.
Figure 9B:
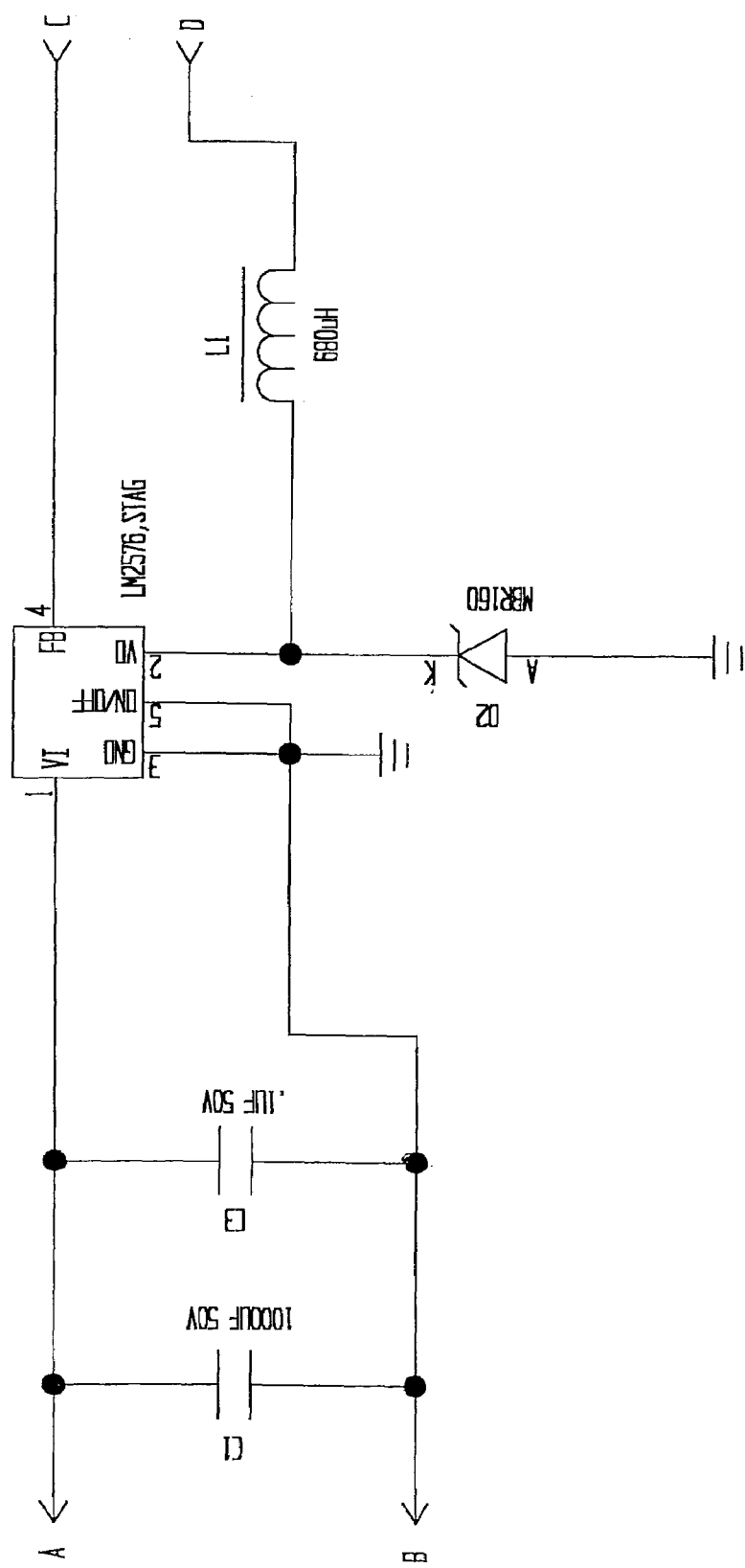
Figure 9C:
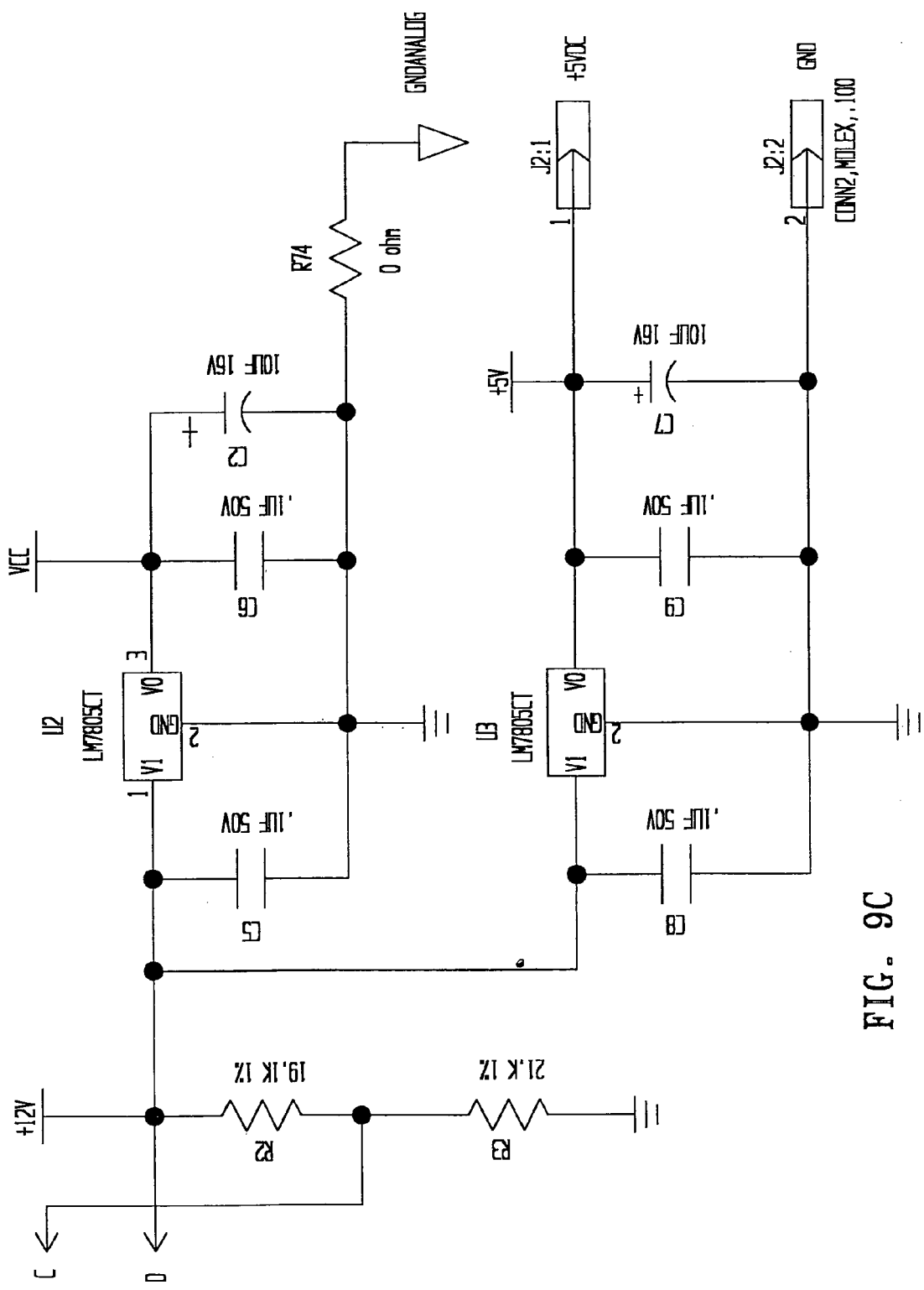
Figure 9D:
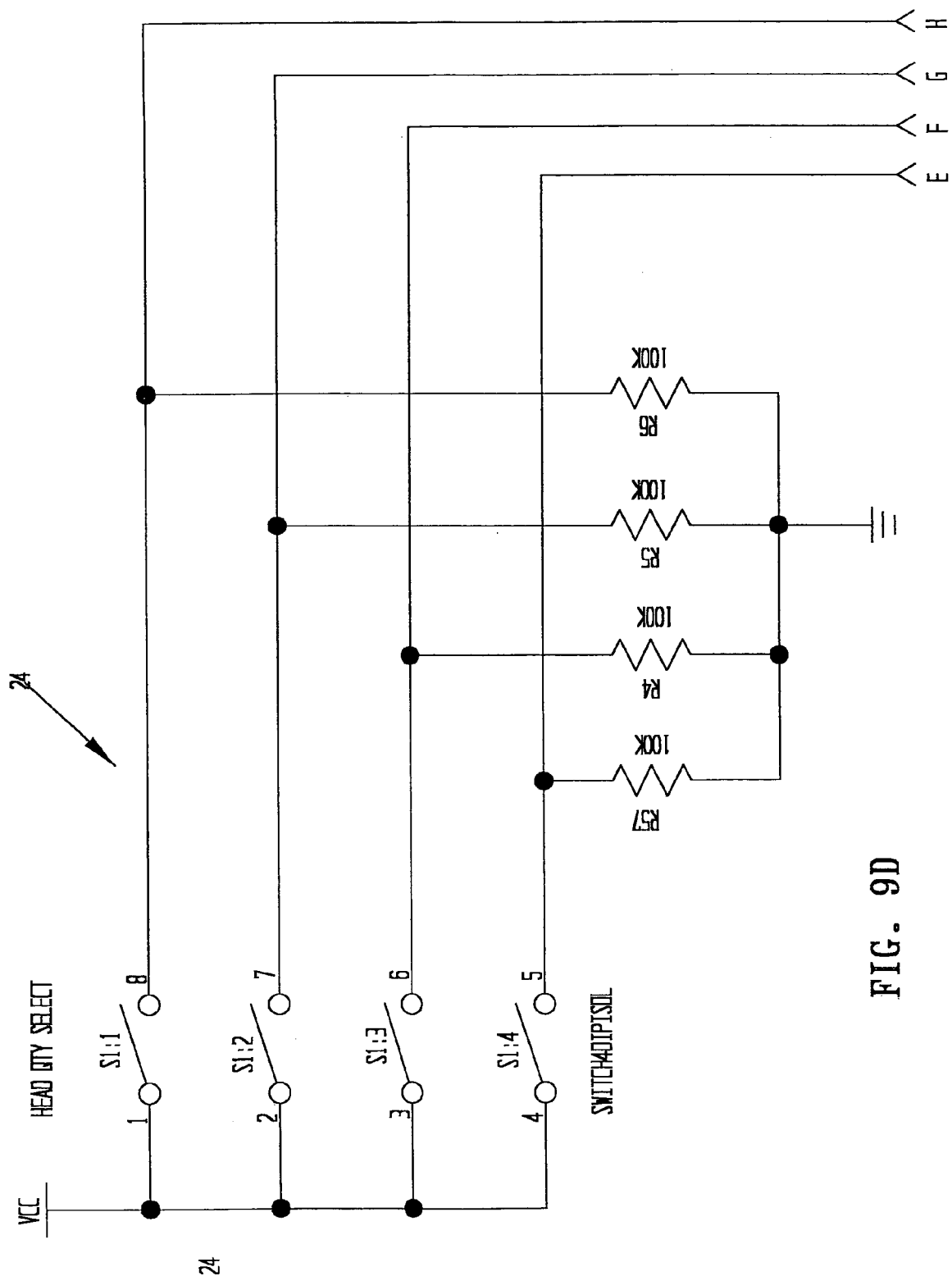
Figure 9E:
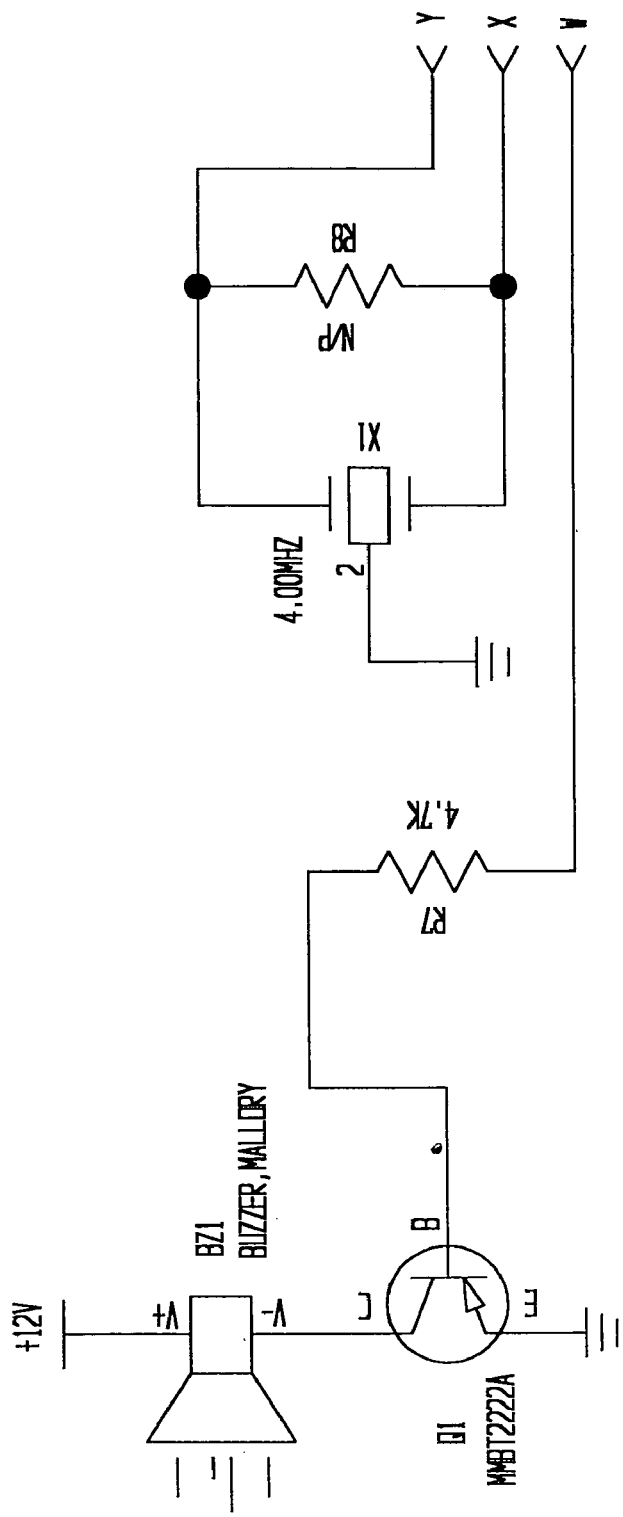
Figure 9F:
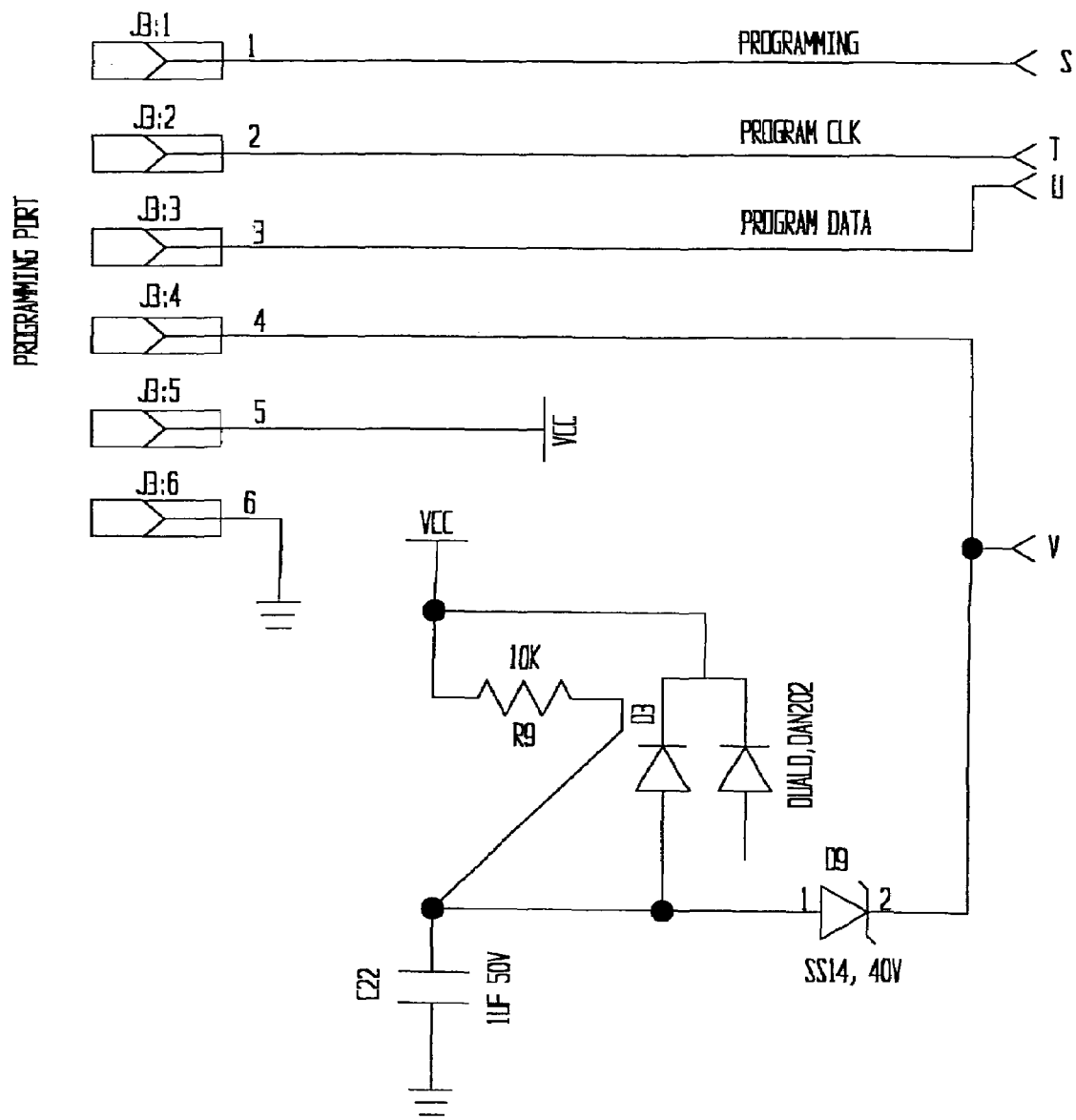
Figure 9G:
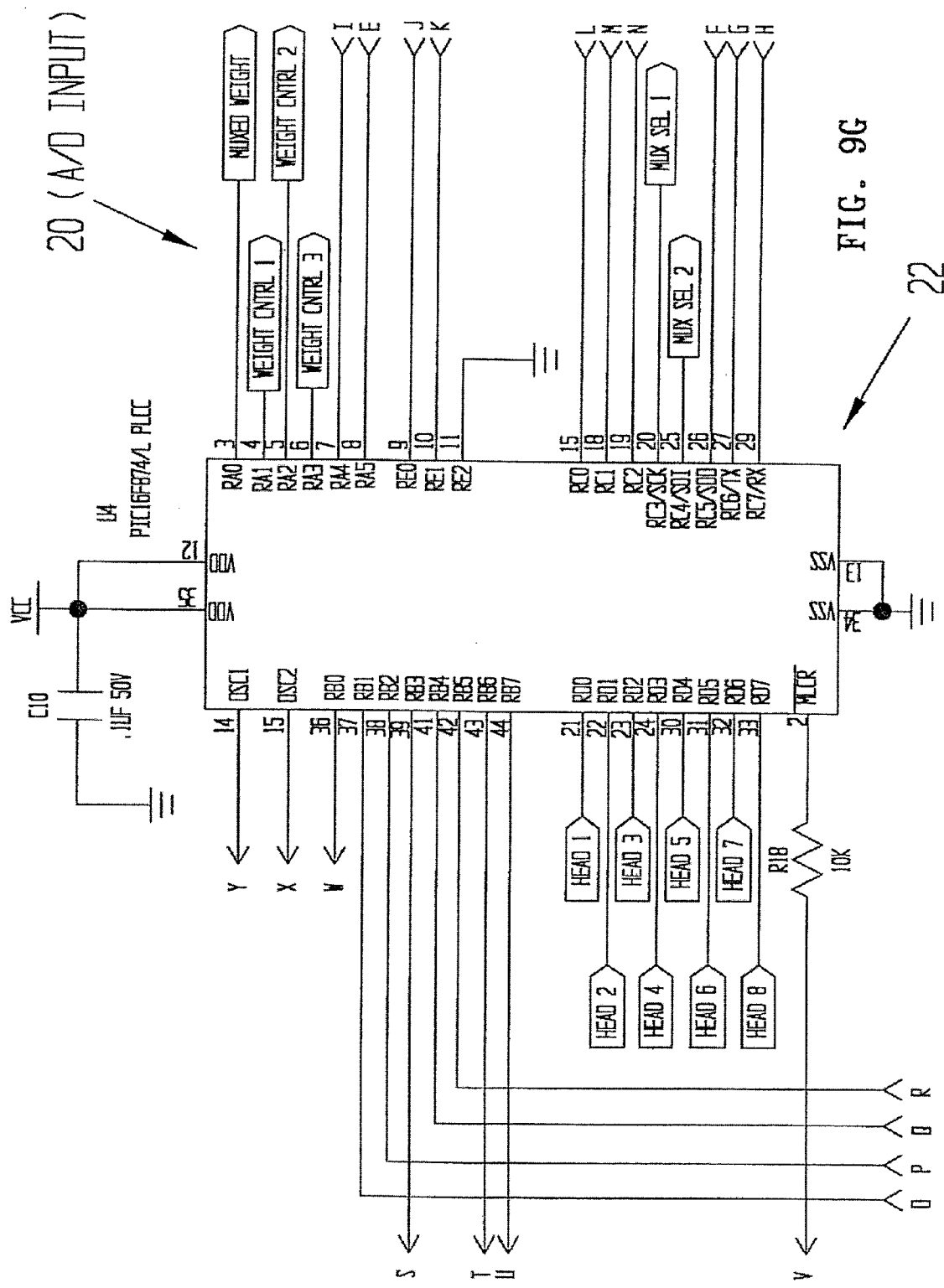
Figure 9H:
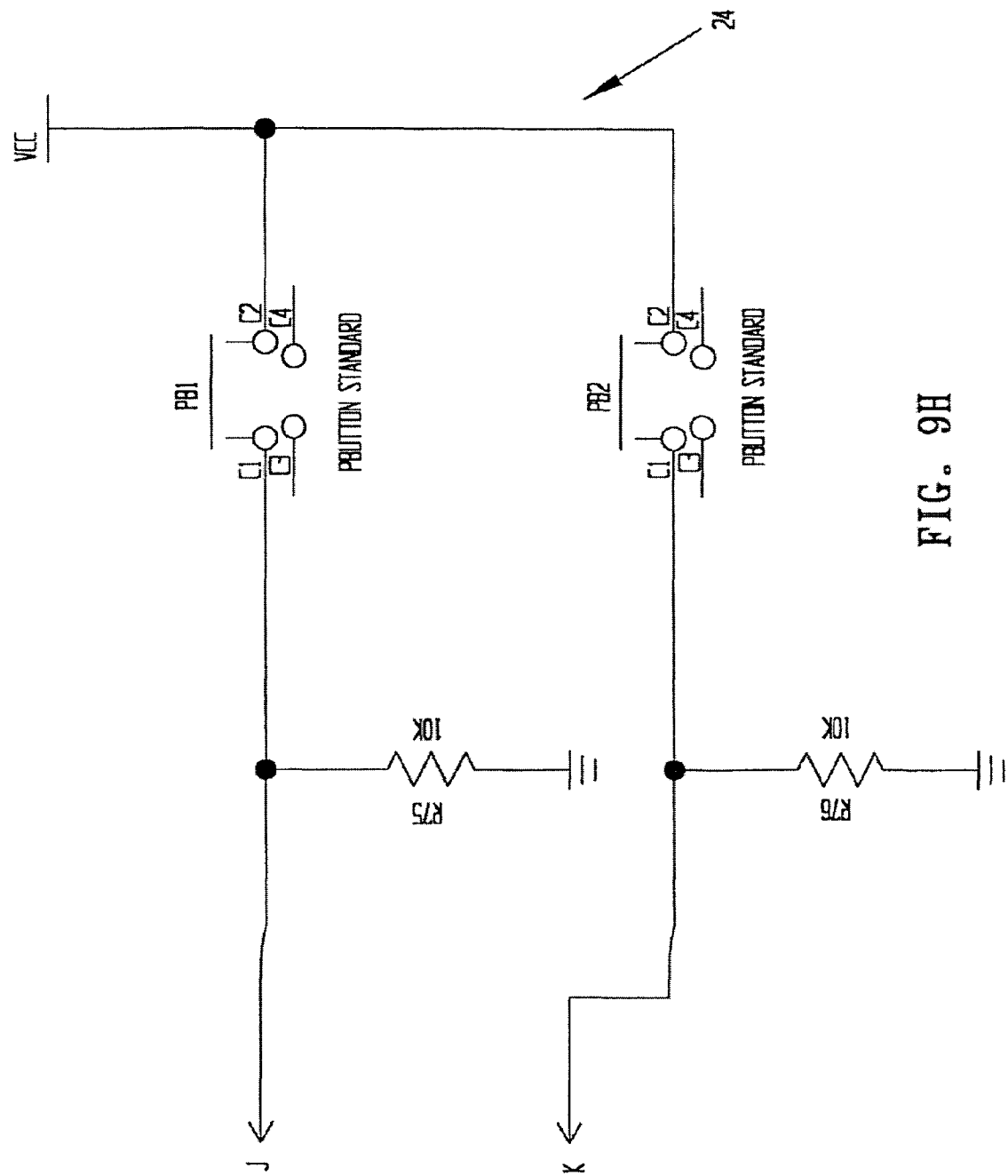
Figure 9I:
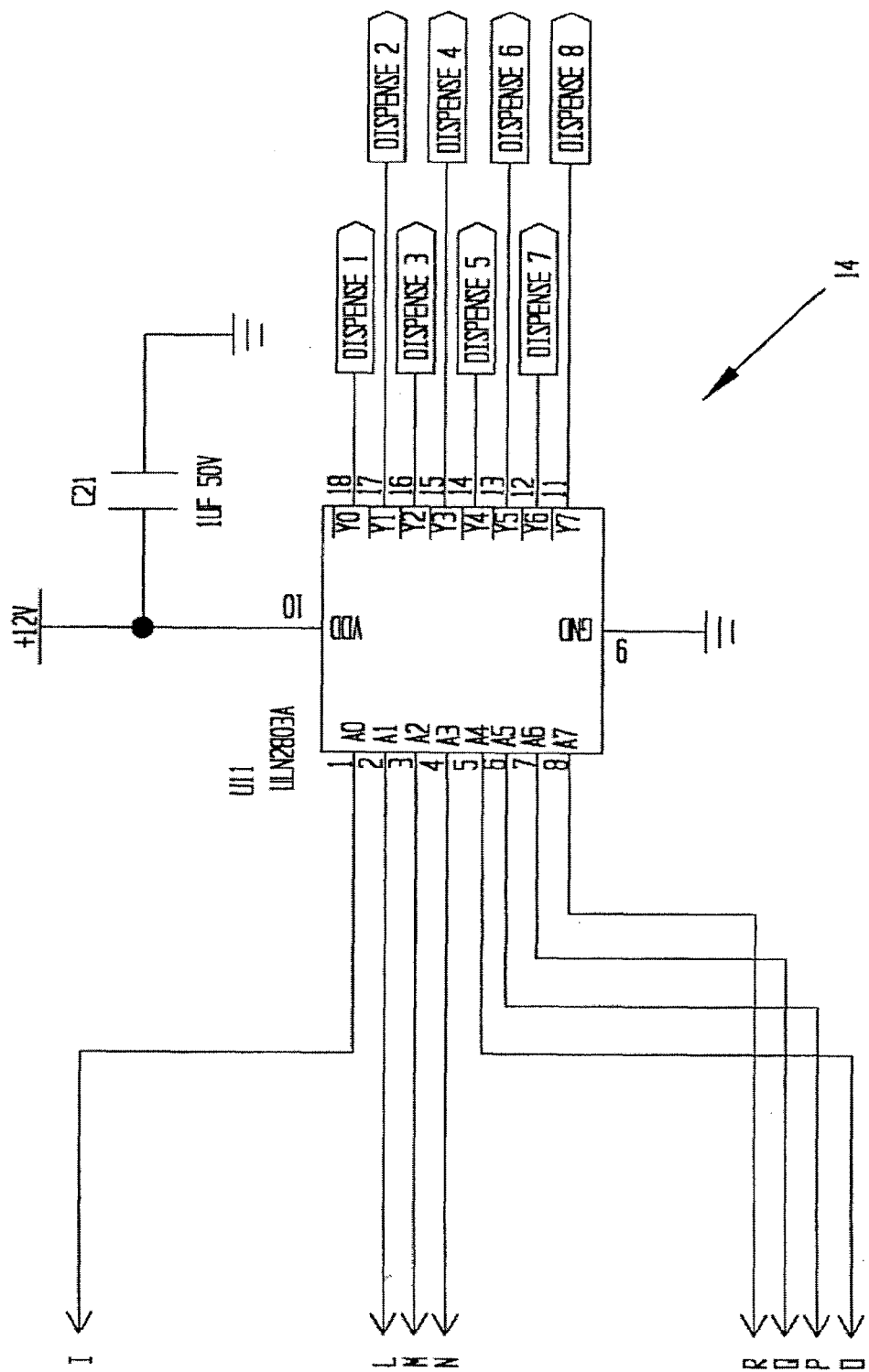
Figures 1, 9J:
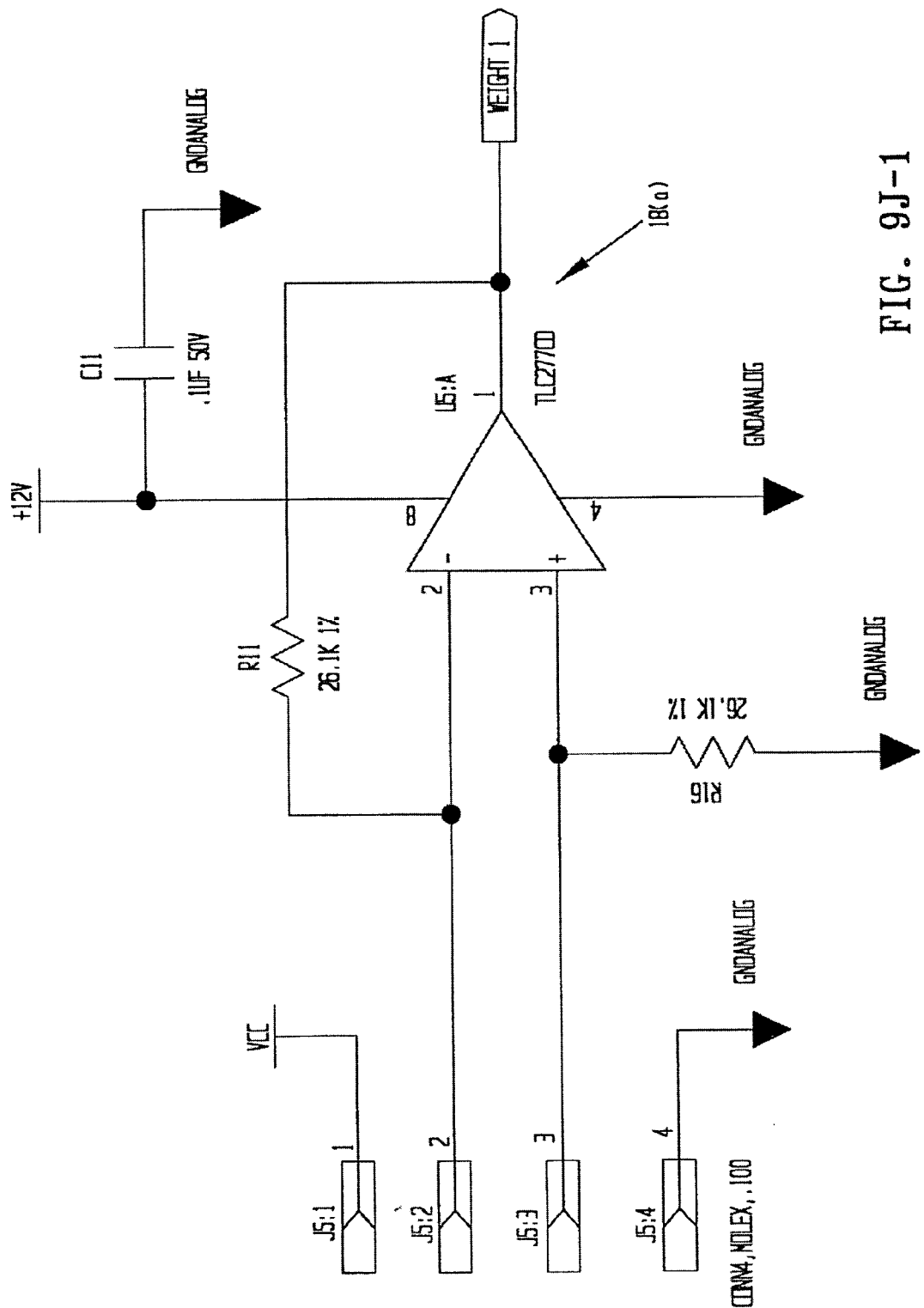
FIG. 1 is a top view of a load cell that may be used in the present invention.
Figures 2, 9J:
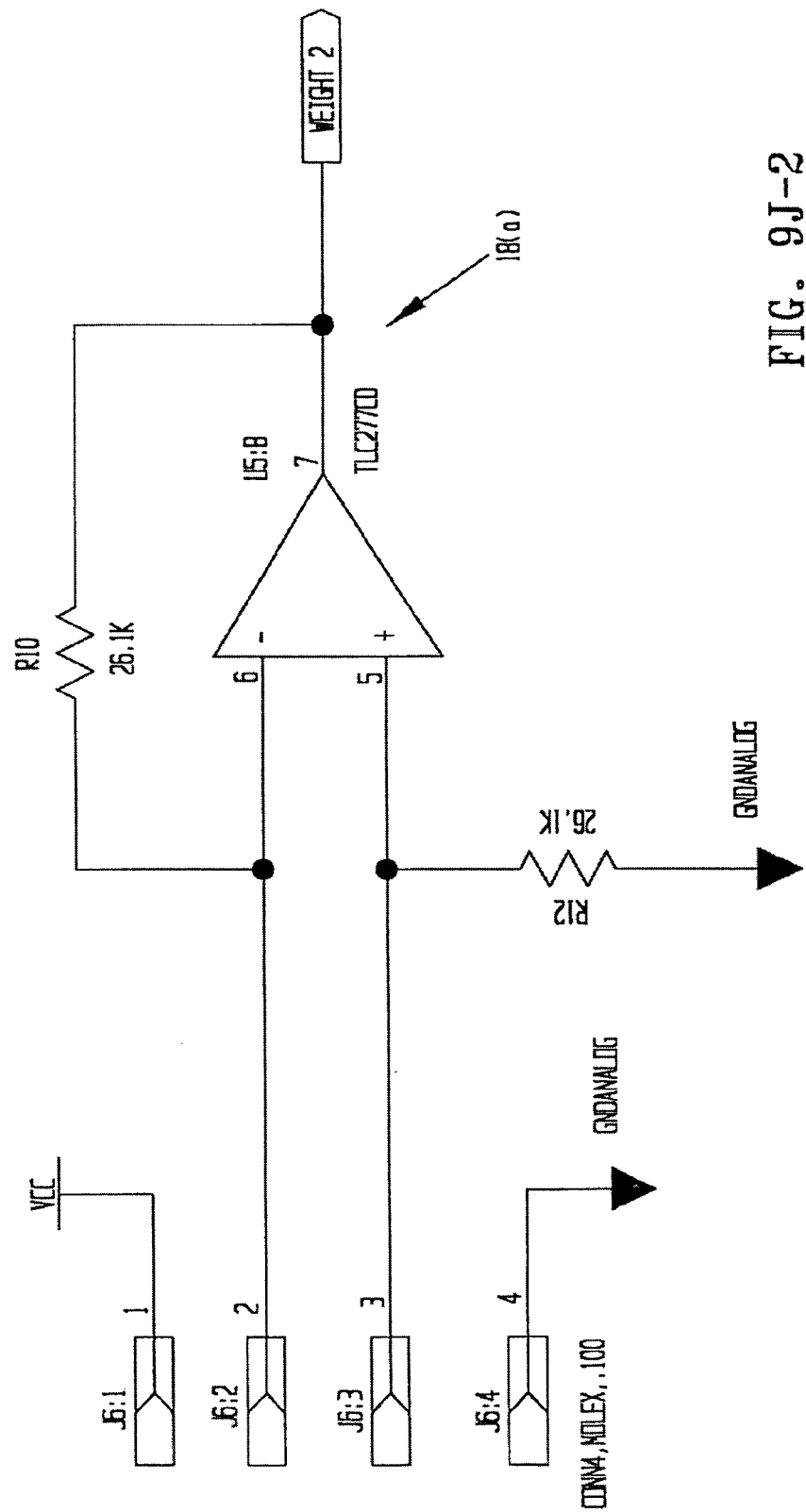
FIG. 2 is a side view of the load cell of FIG. 1.
Figures 3, 9J:
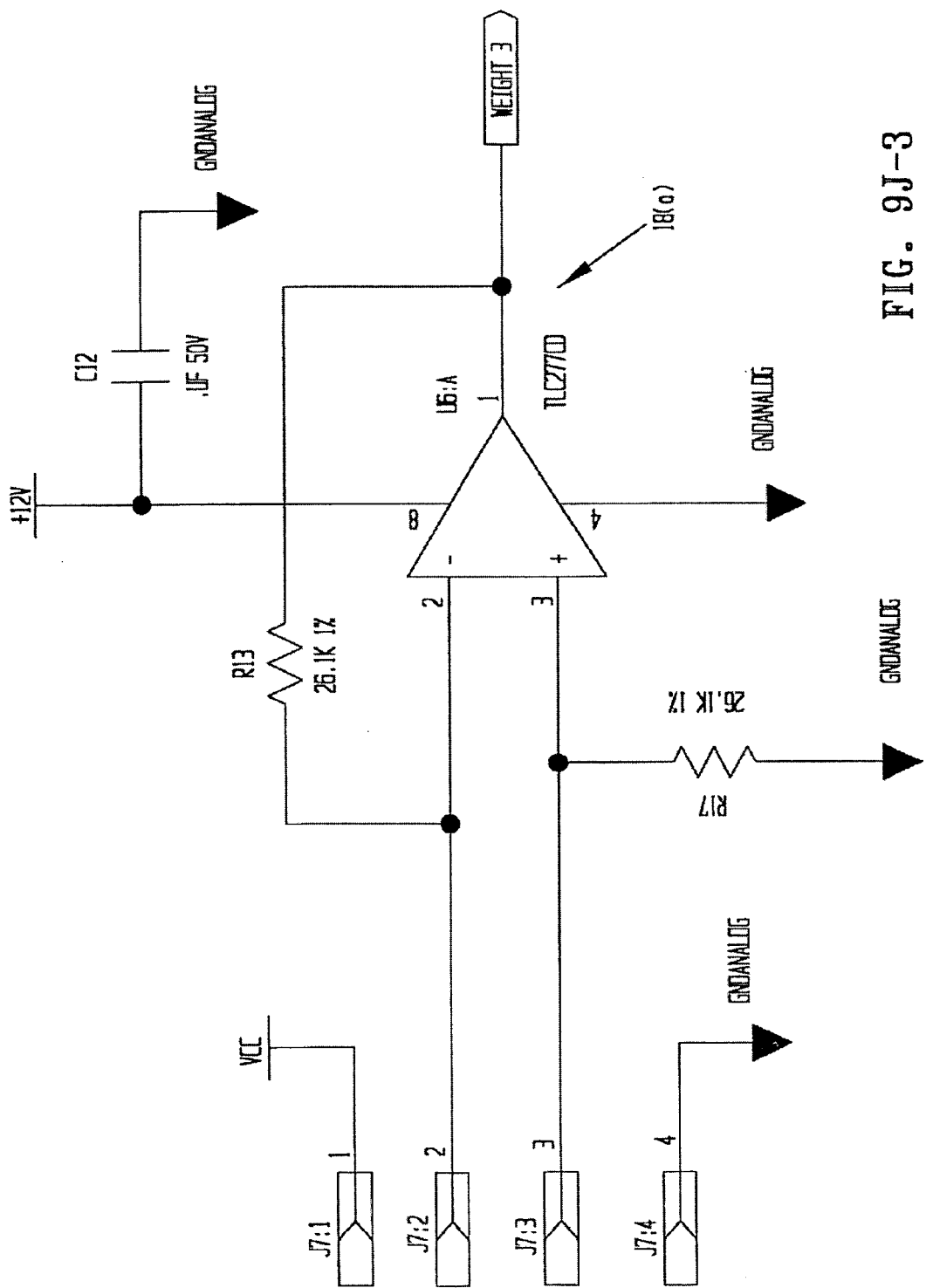
Figures 4, 9J:
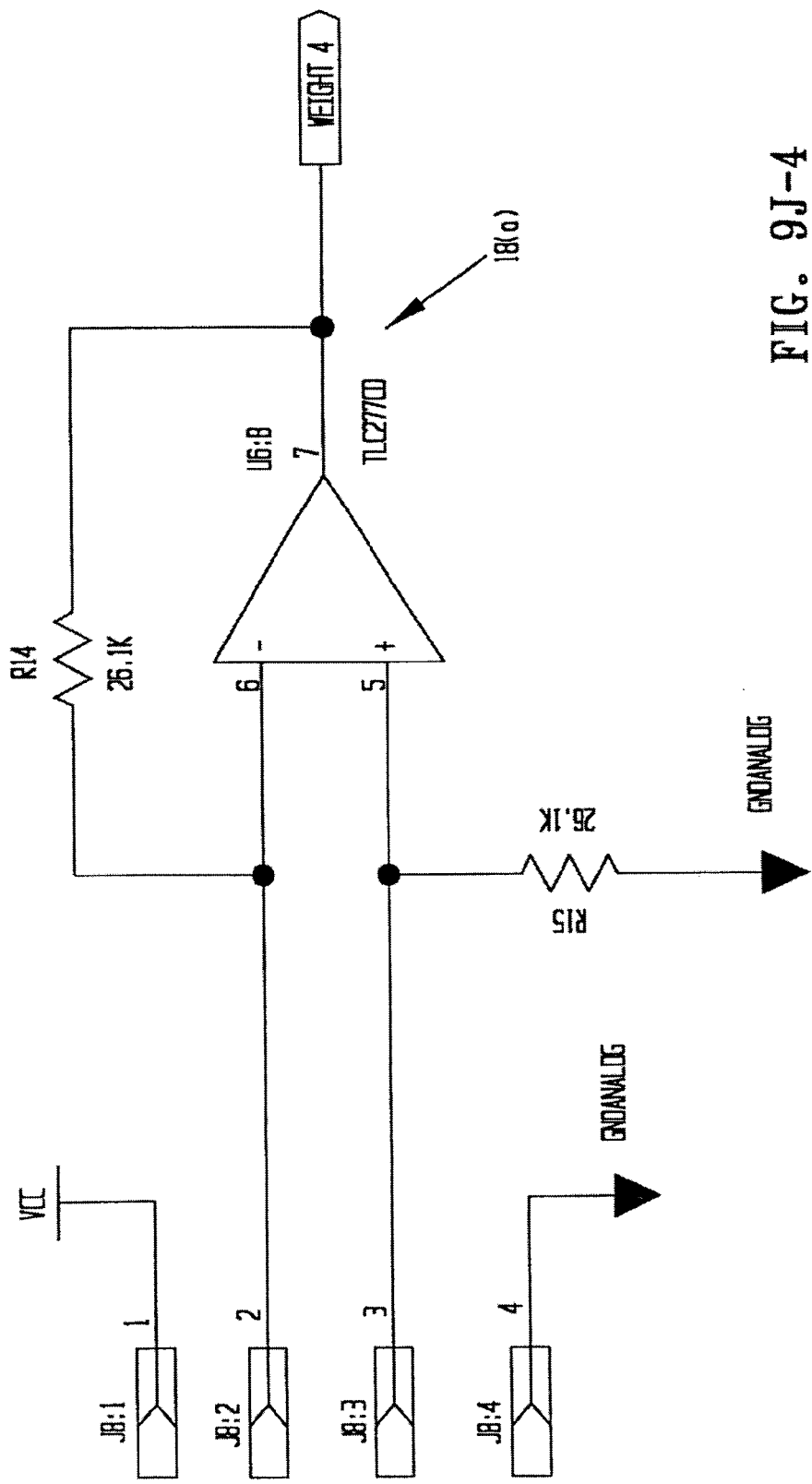
FIG. 4a is a top/side perspective view of the load cell of FIG. 1.
FIG. 4b is a bottom/side perspective view of the load cell of FIG. 1.
Figures 1, 9K:
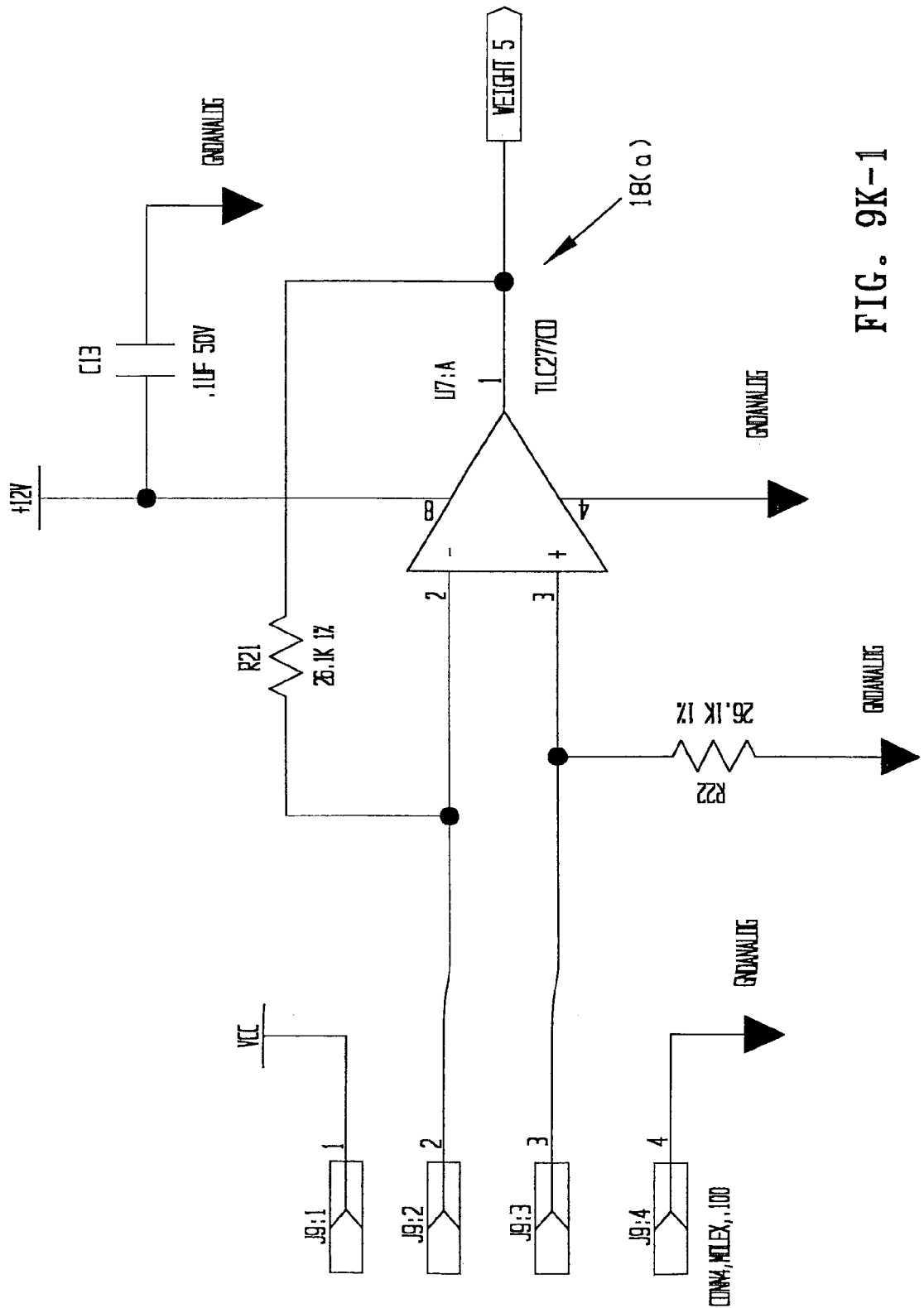
Figures 2, 9K:
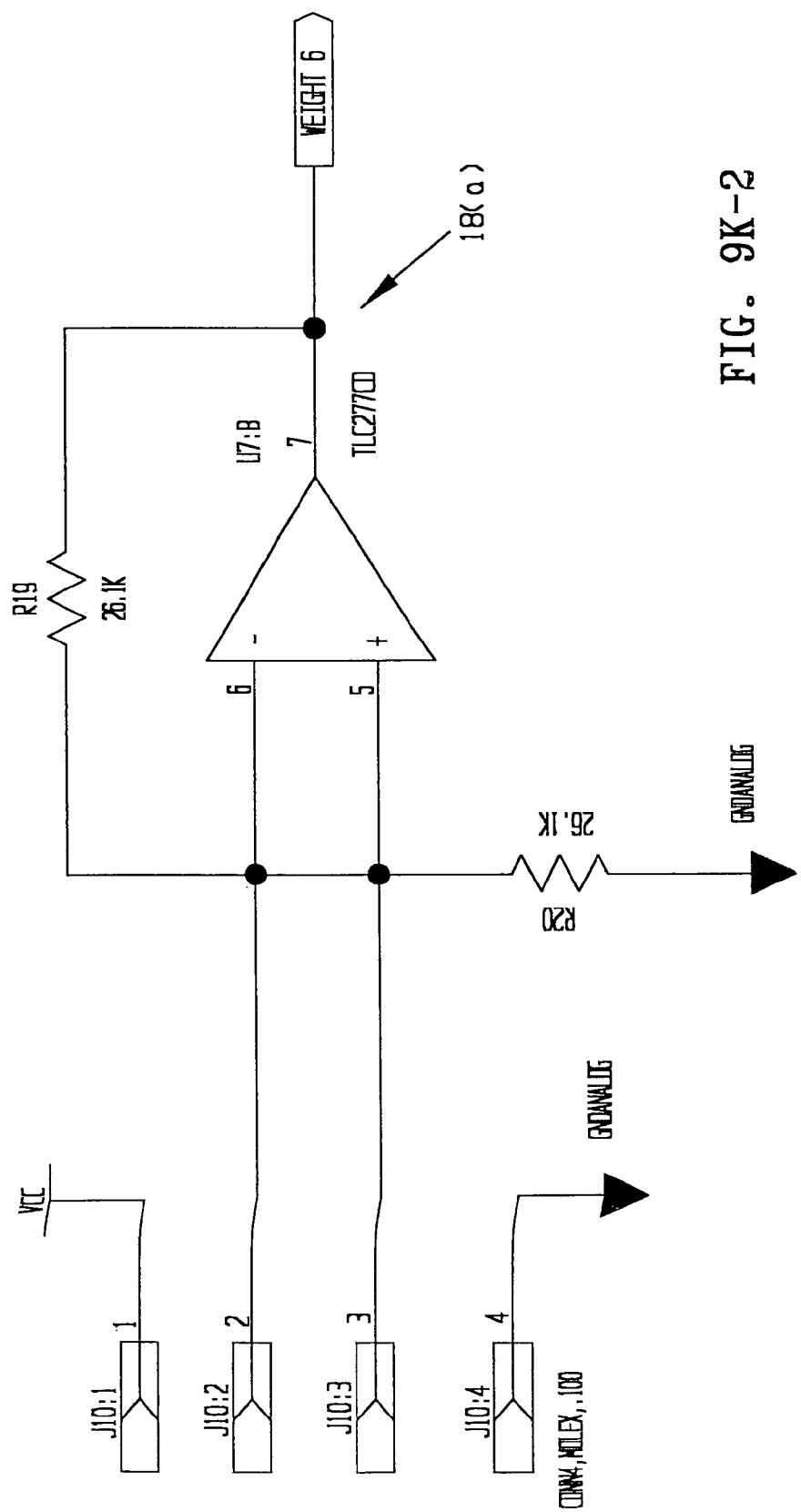
Figures 3, 9K:
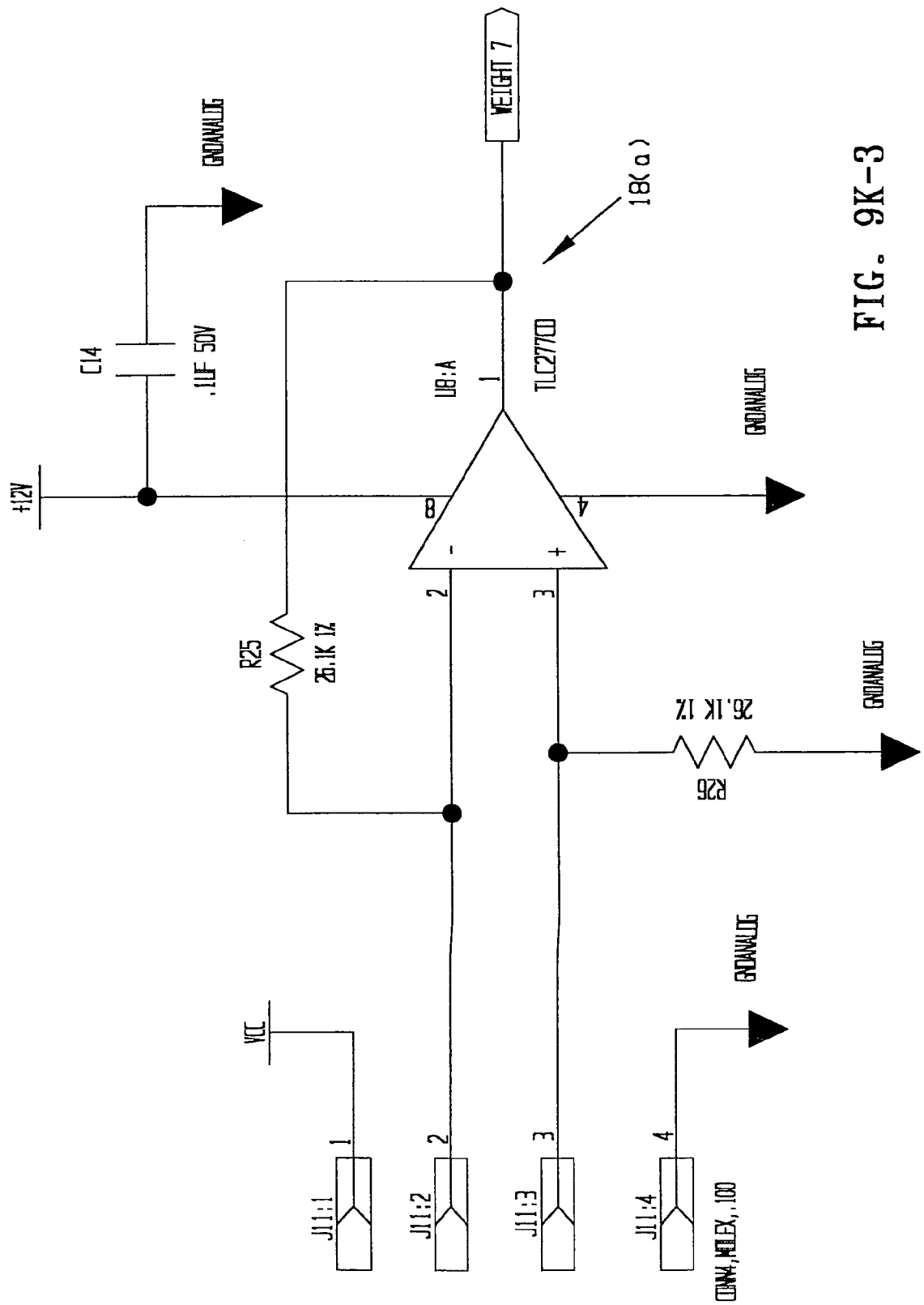
Figures 4, 9K:
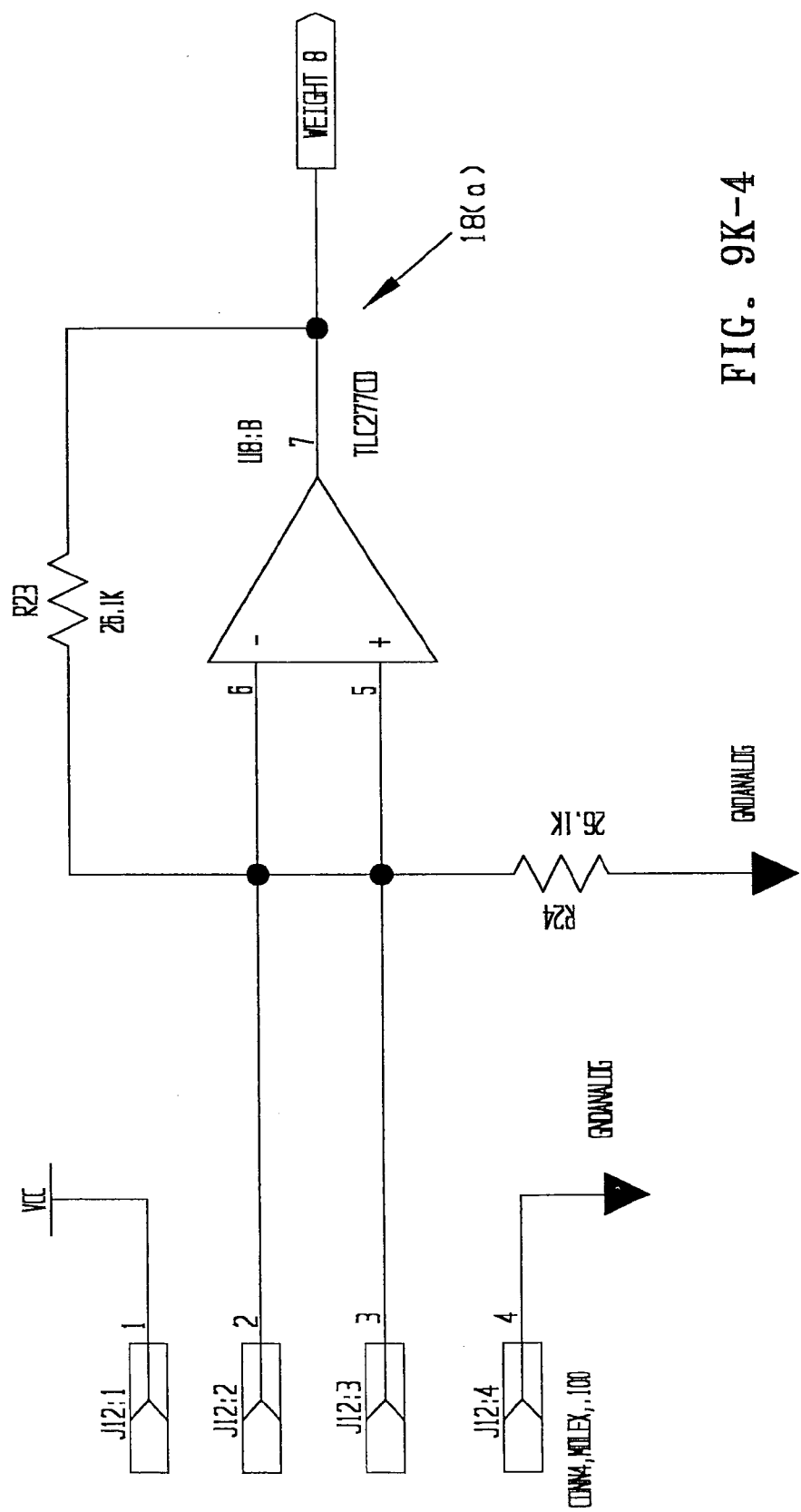
Figures 5, 9K:
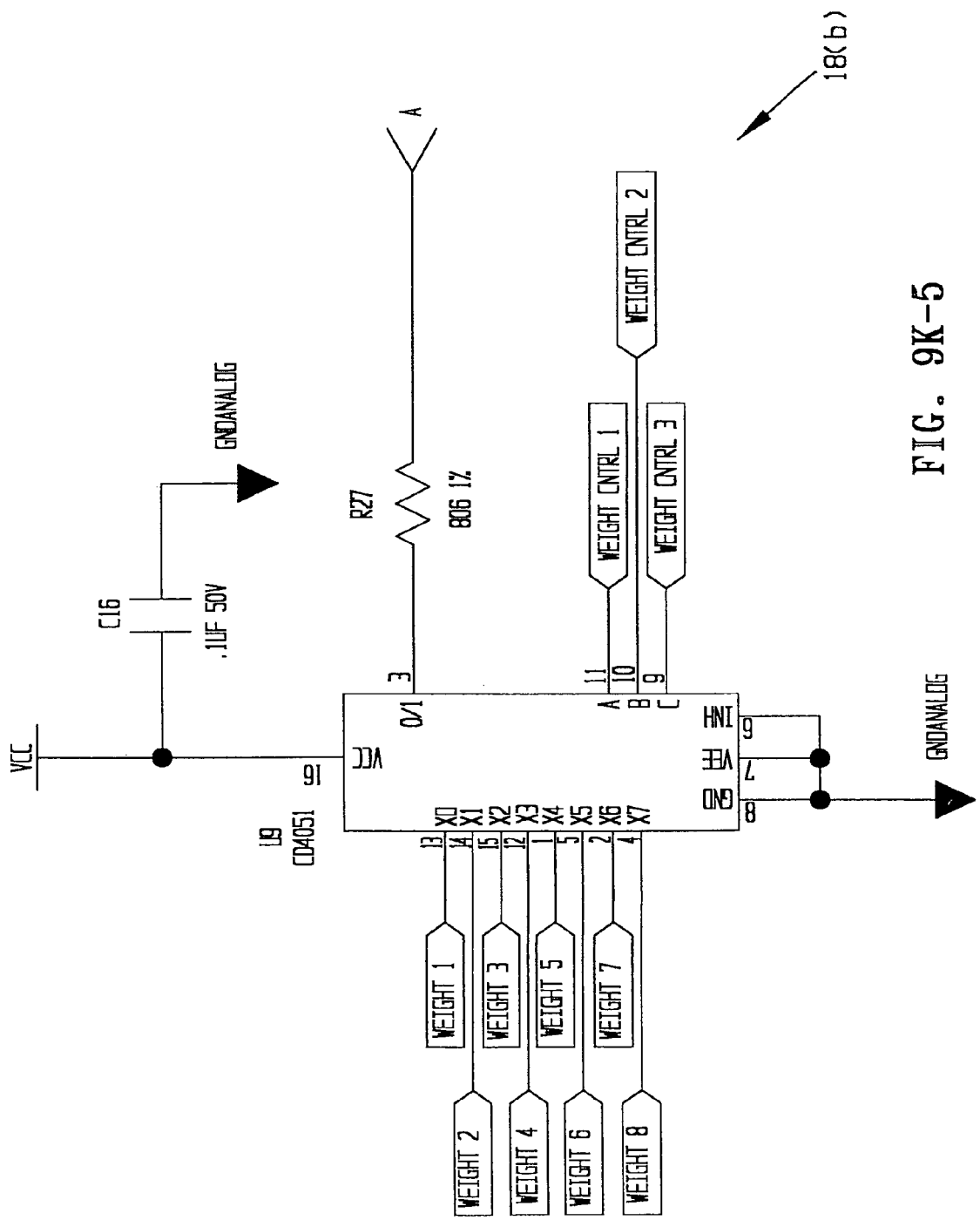
Figures 6, 9K:
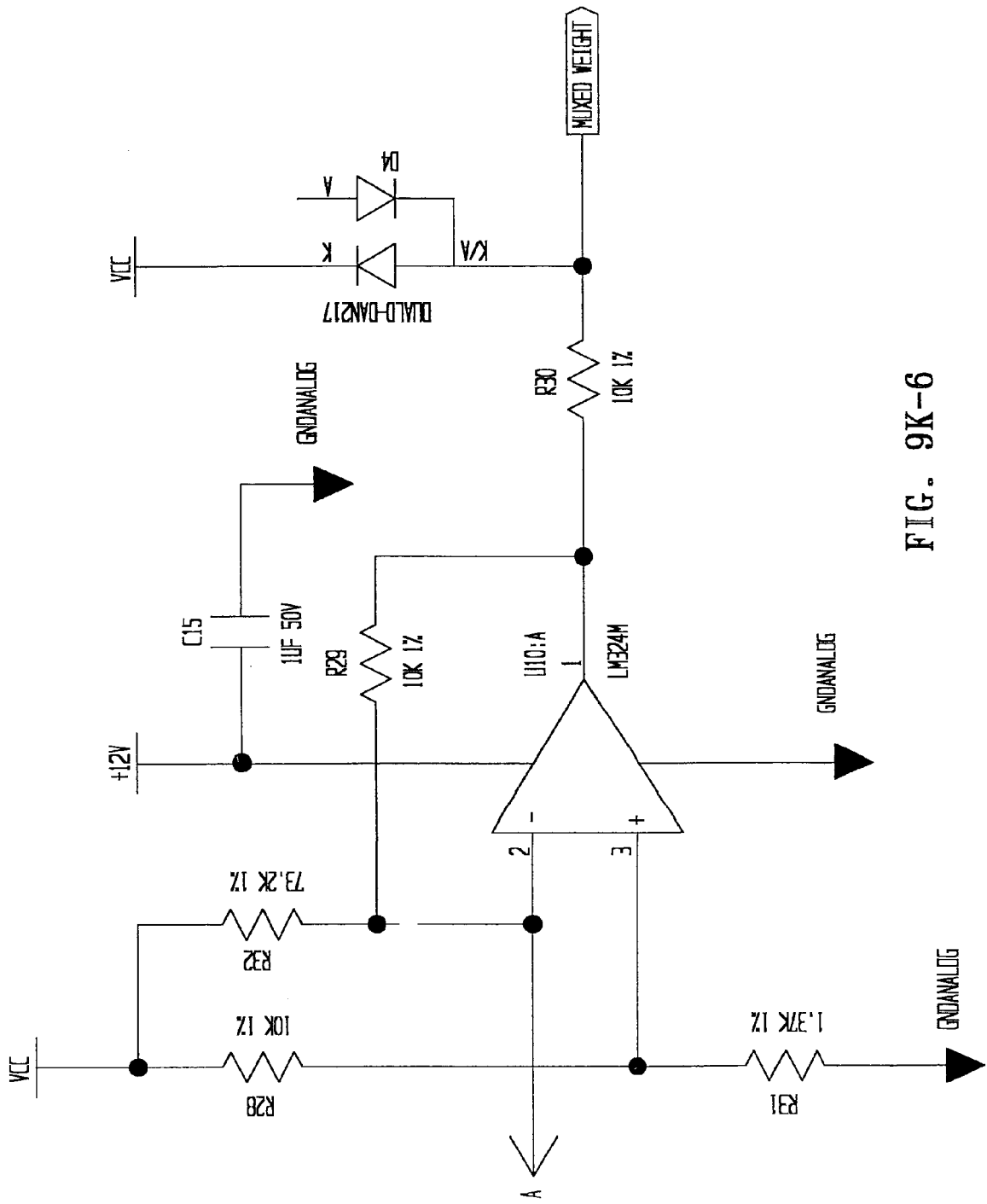
FIG. 6 is a perspective view of the load cell assembly.
Figure 9L:
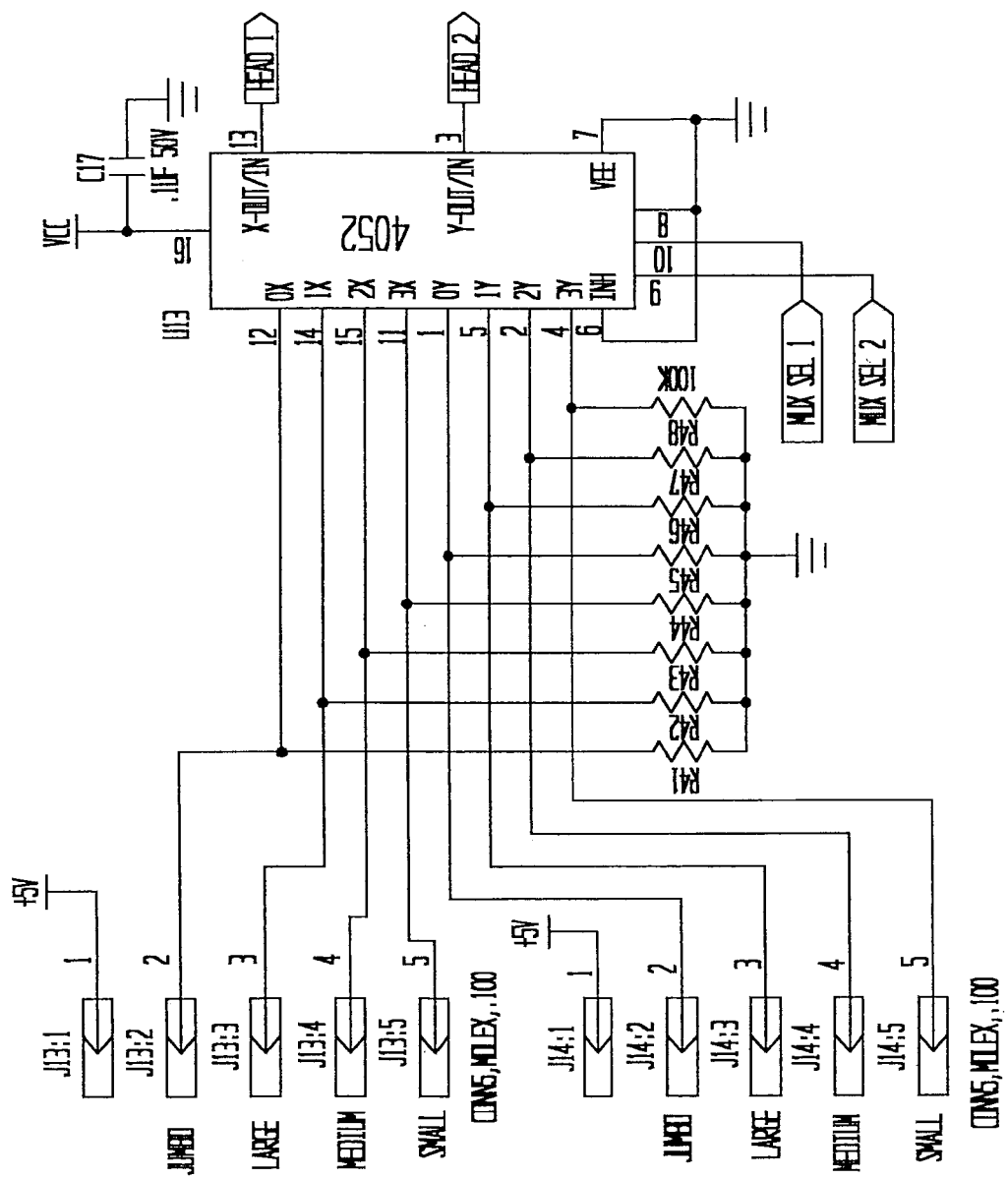
Figure 9M:
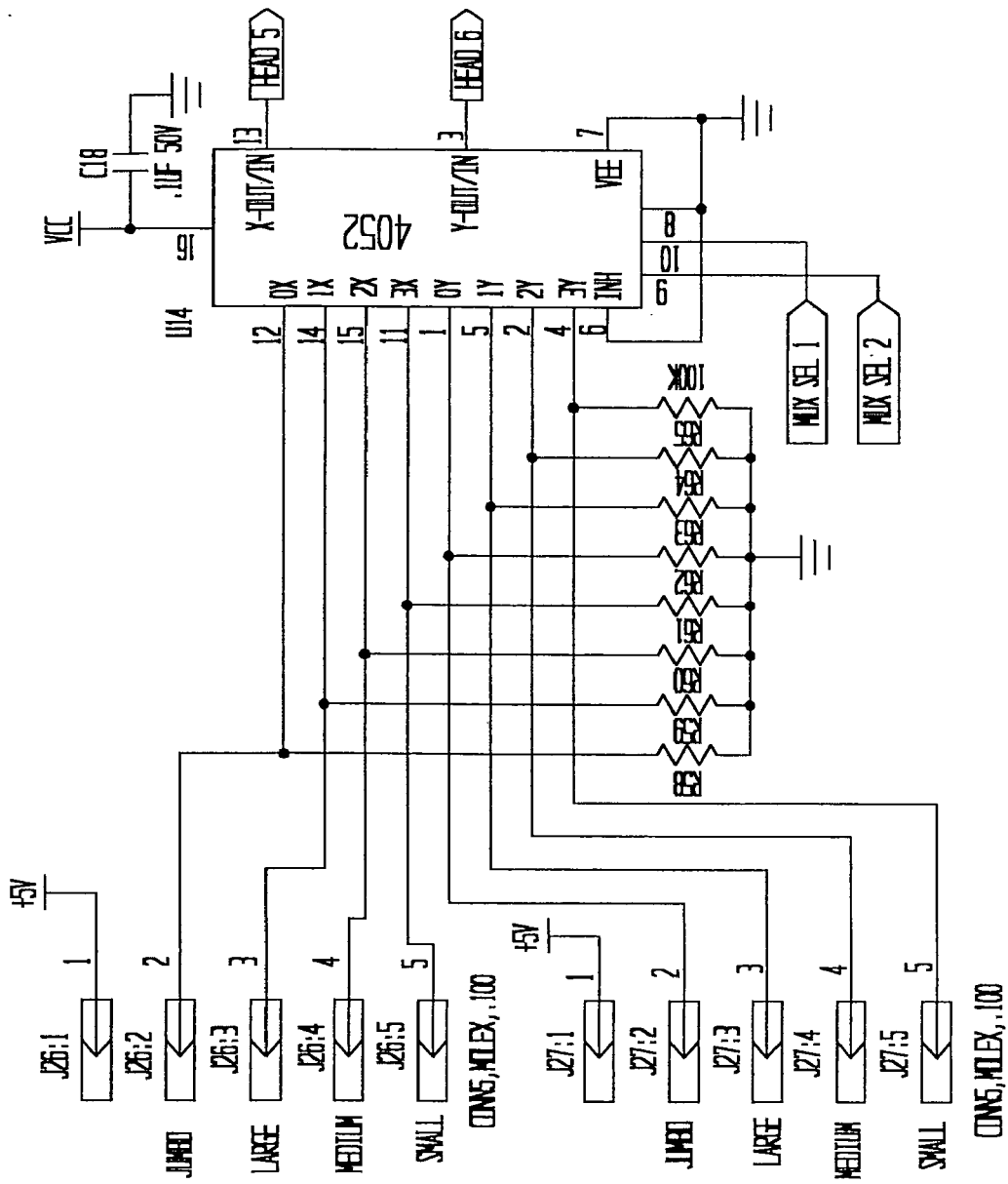
Figure 9N:
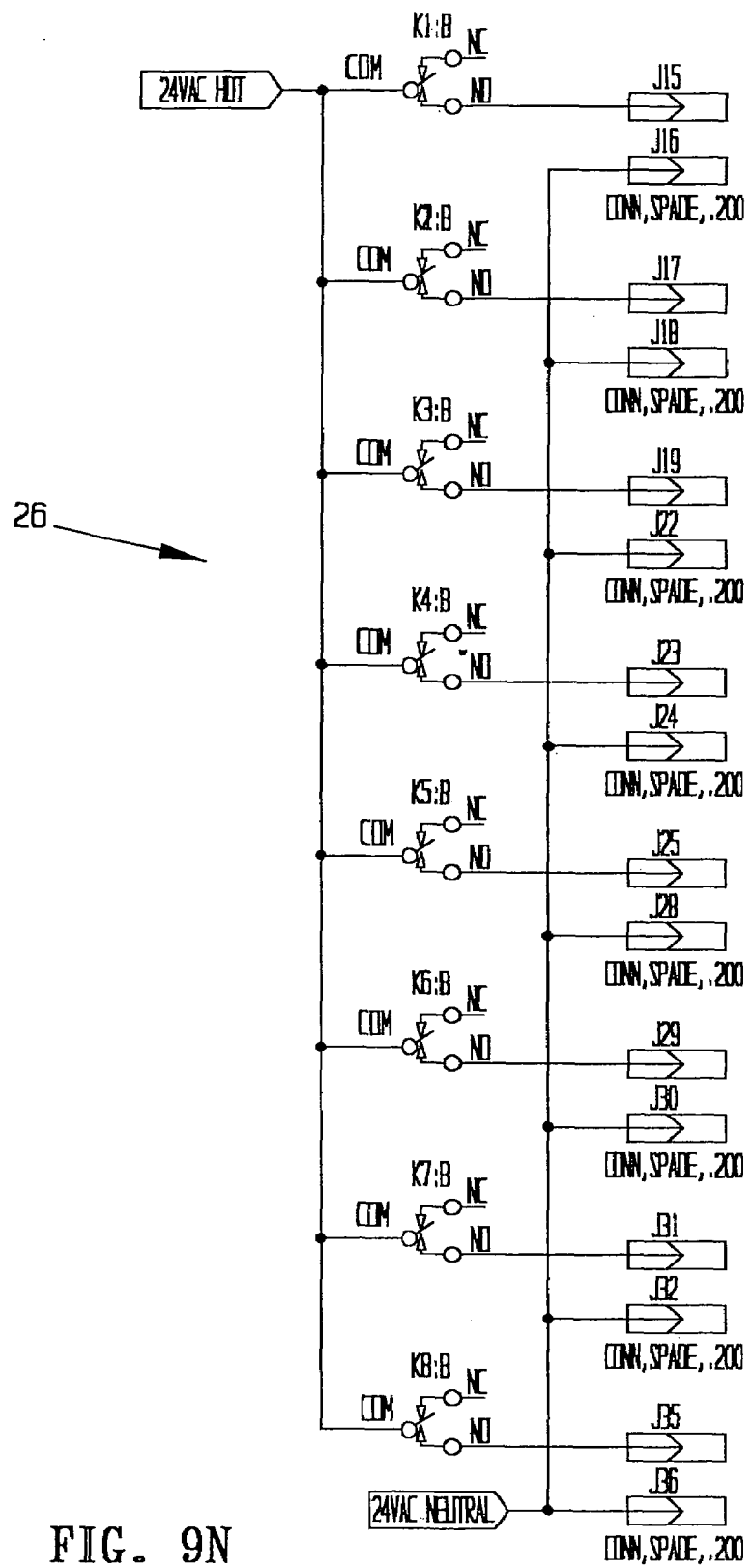
Figure 90:
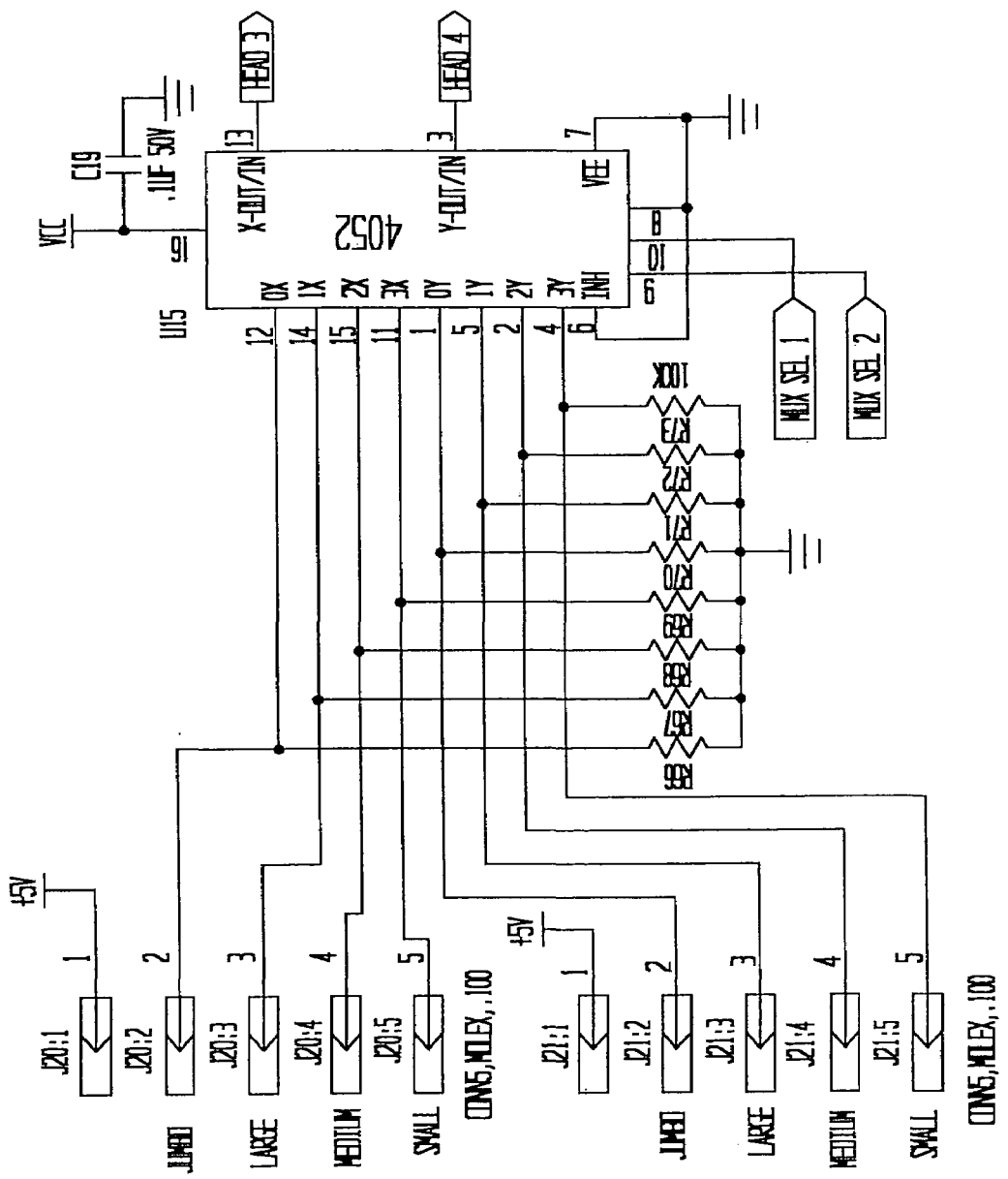
Figure 9P:
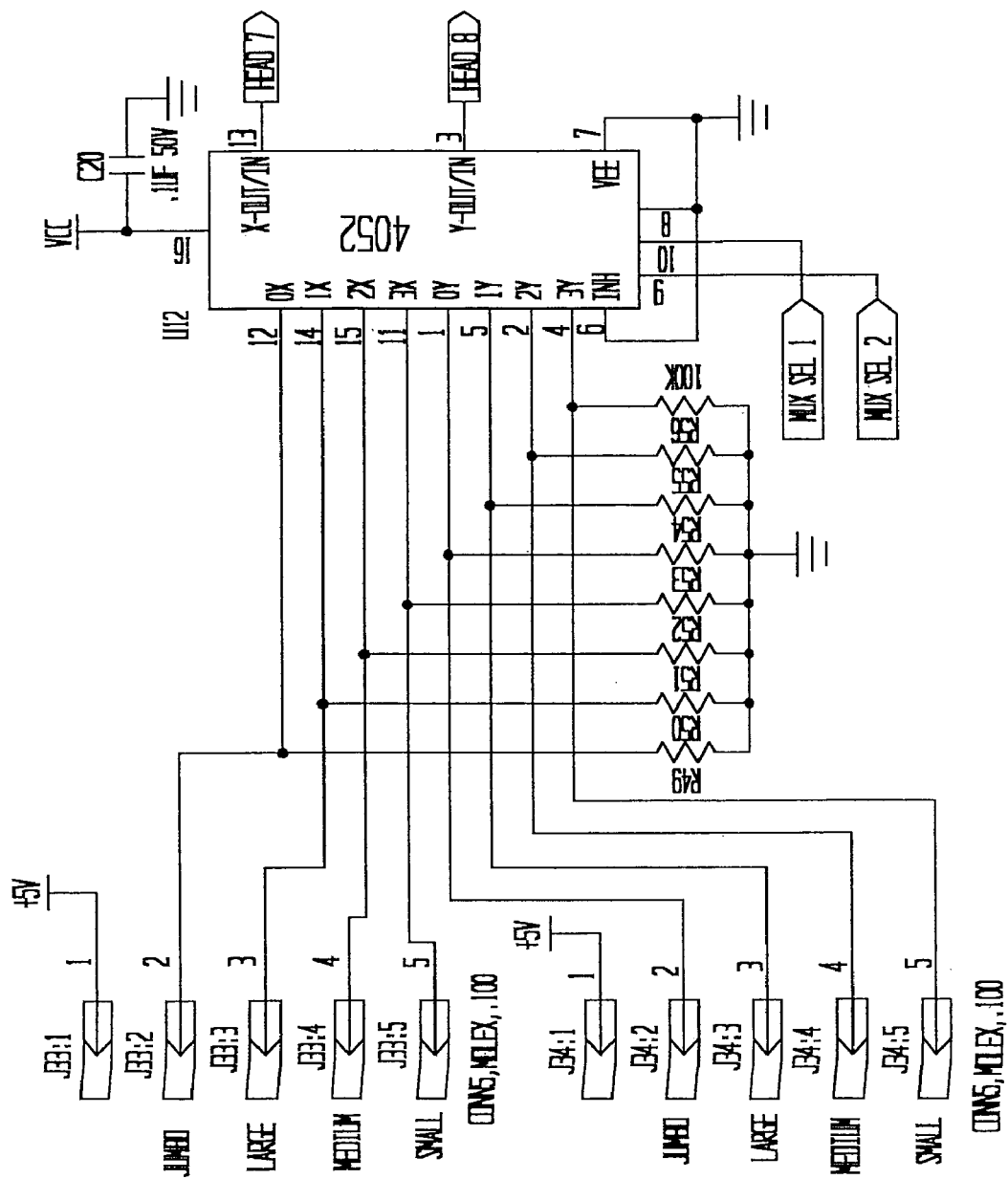
Figure 9Q:
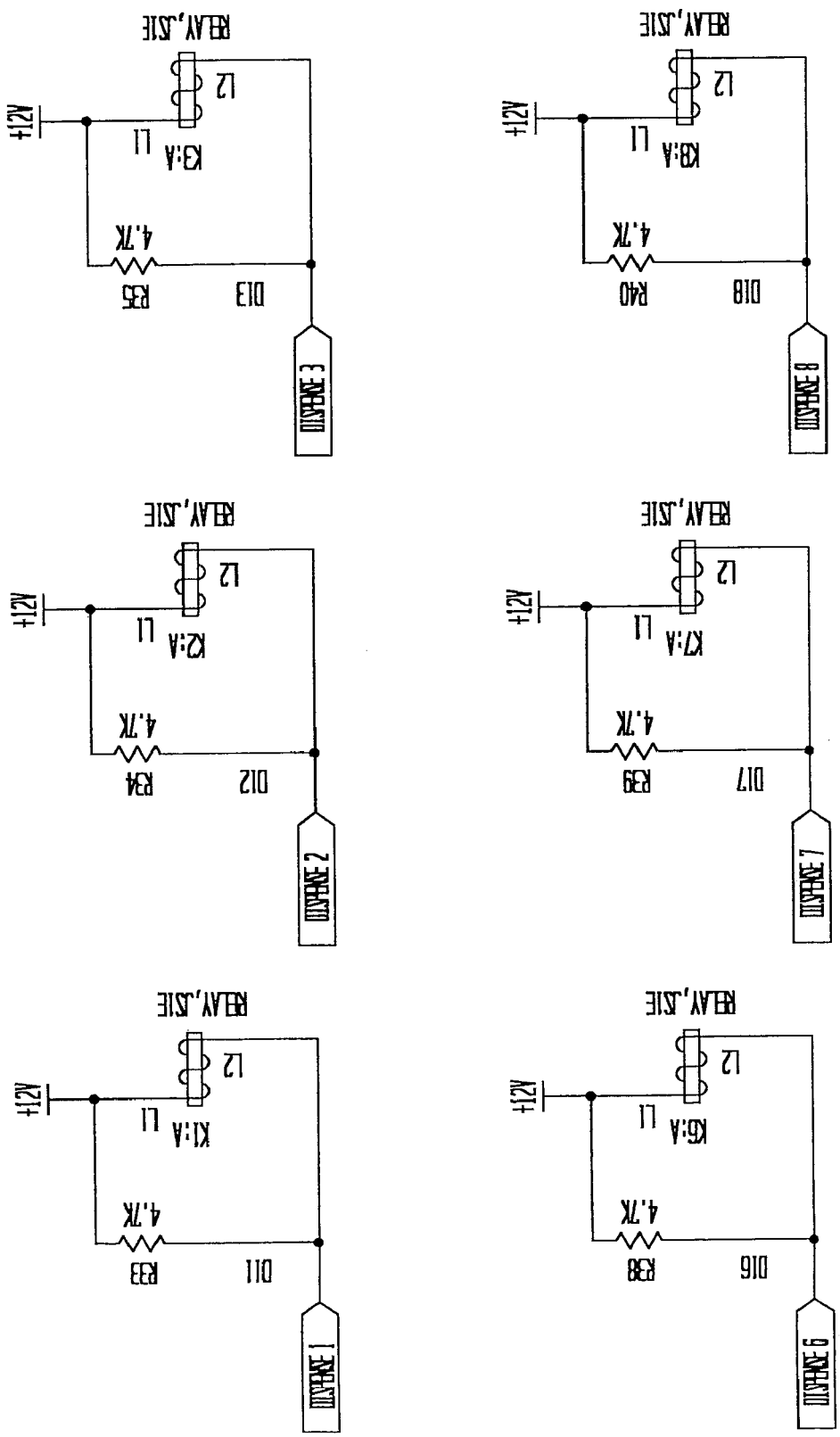
Figure 9R:
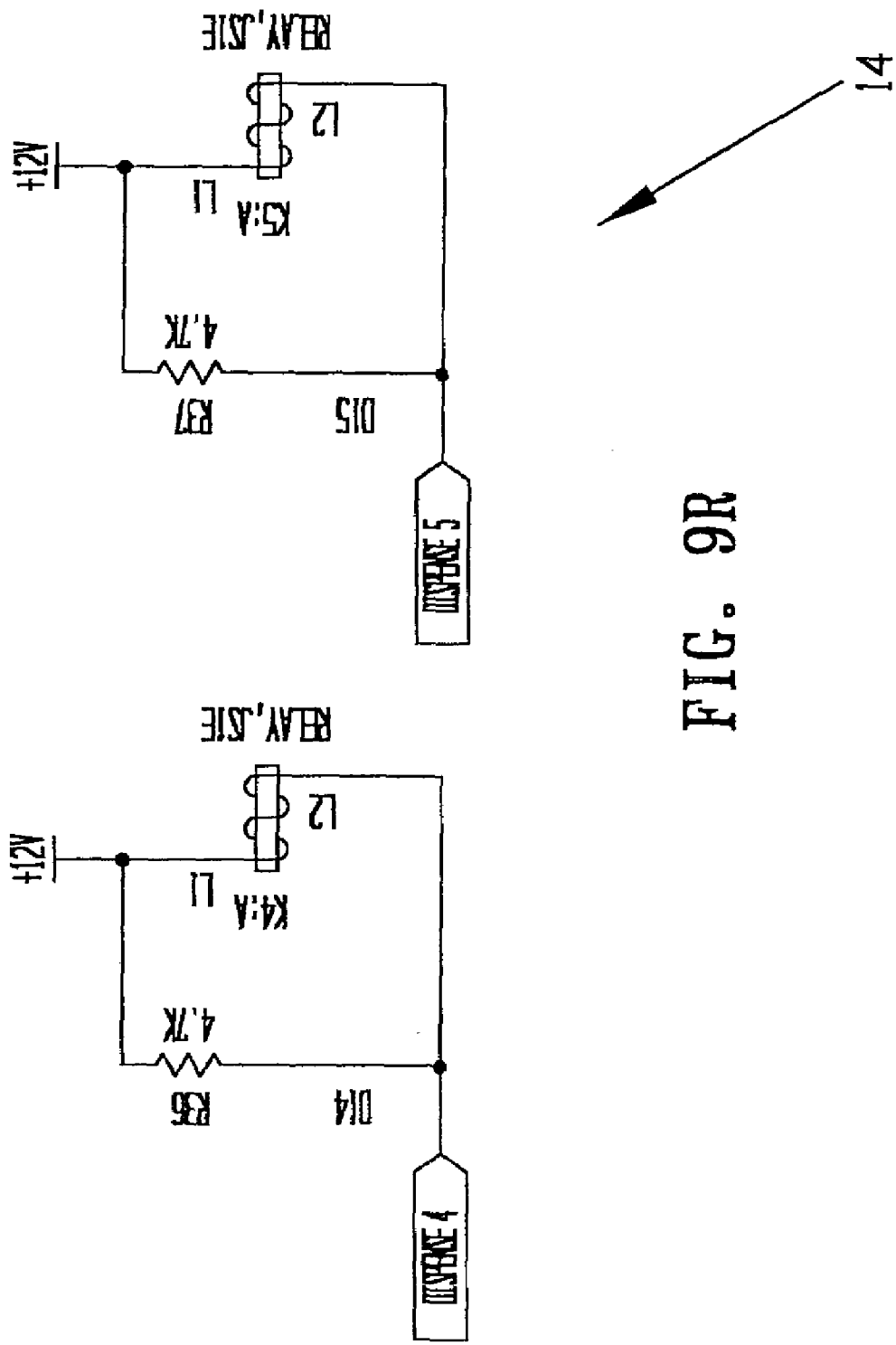
Figure 10A:
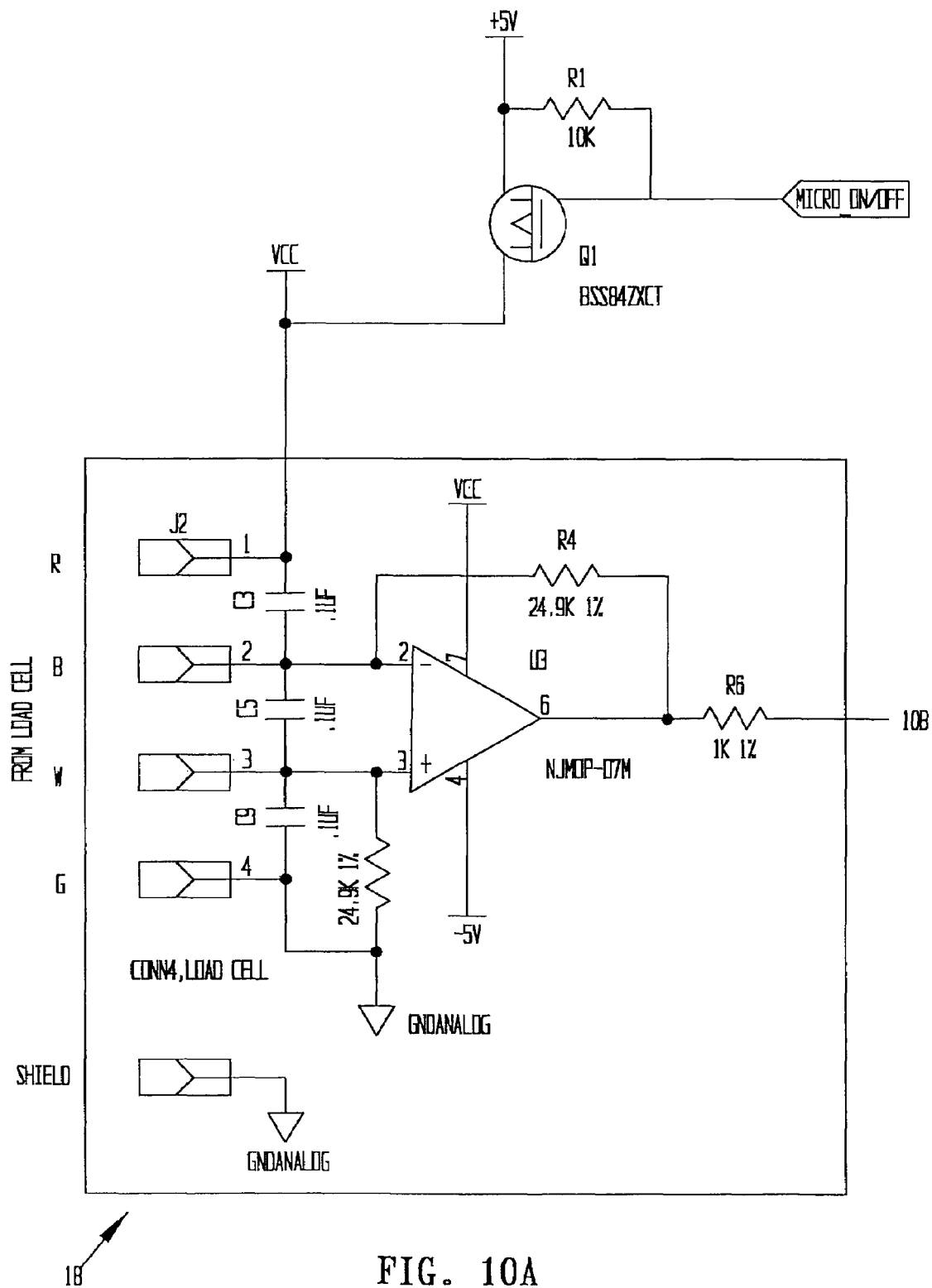
Figure 10B:
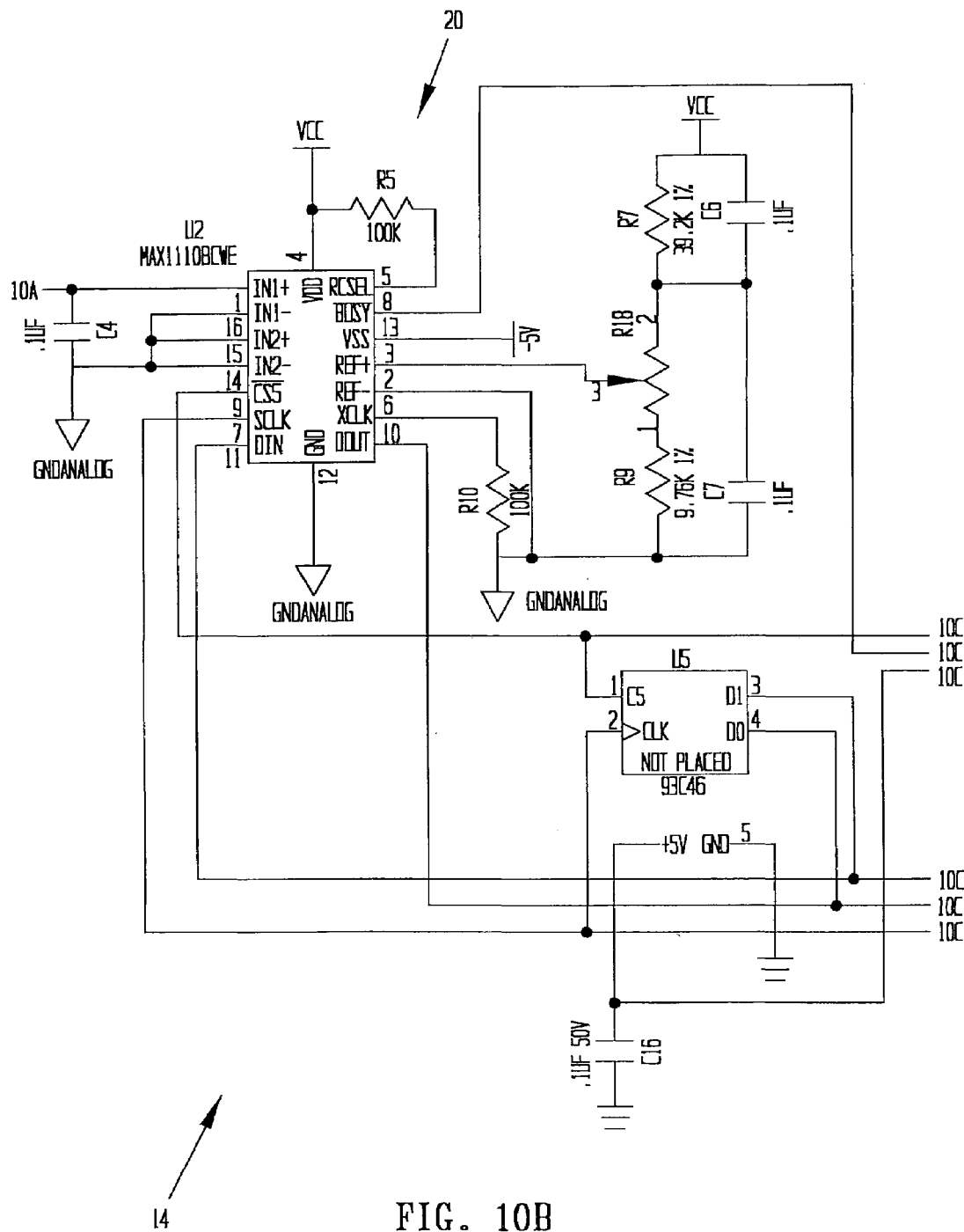
Figure 10C:
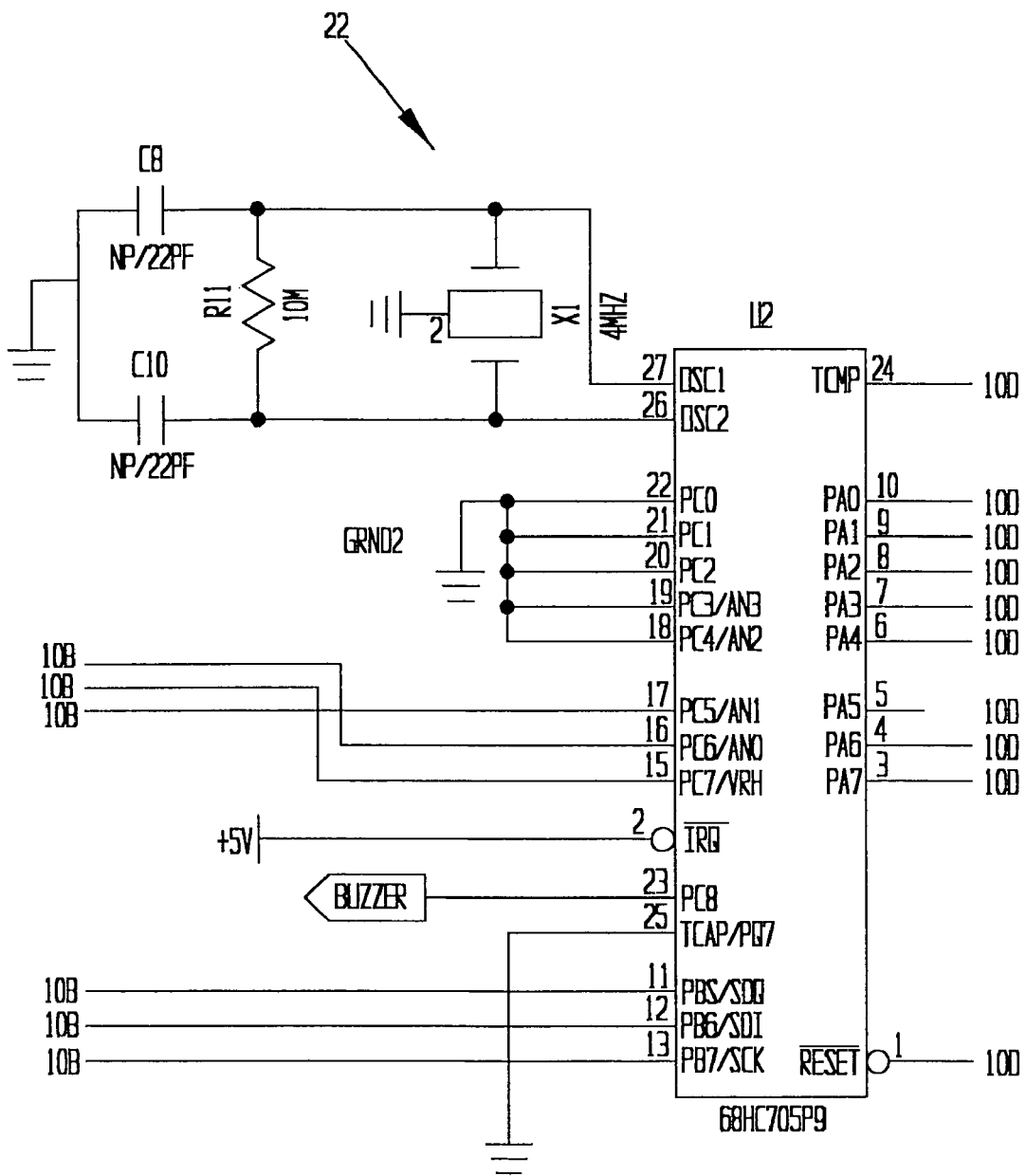
Figure 10D:
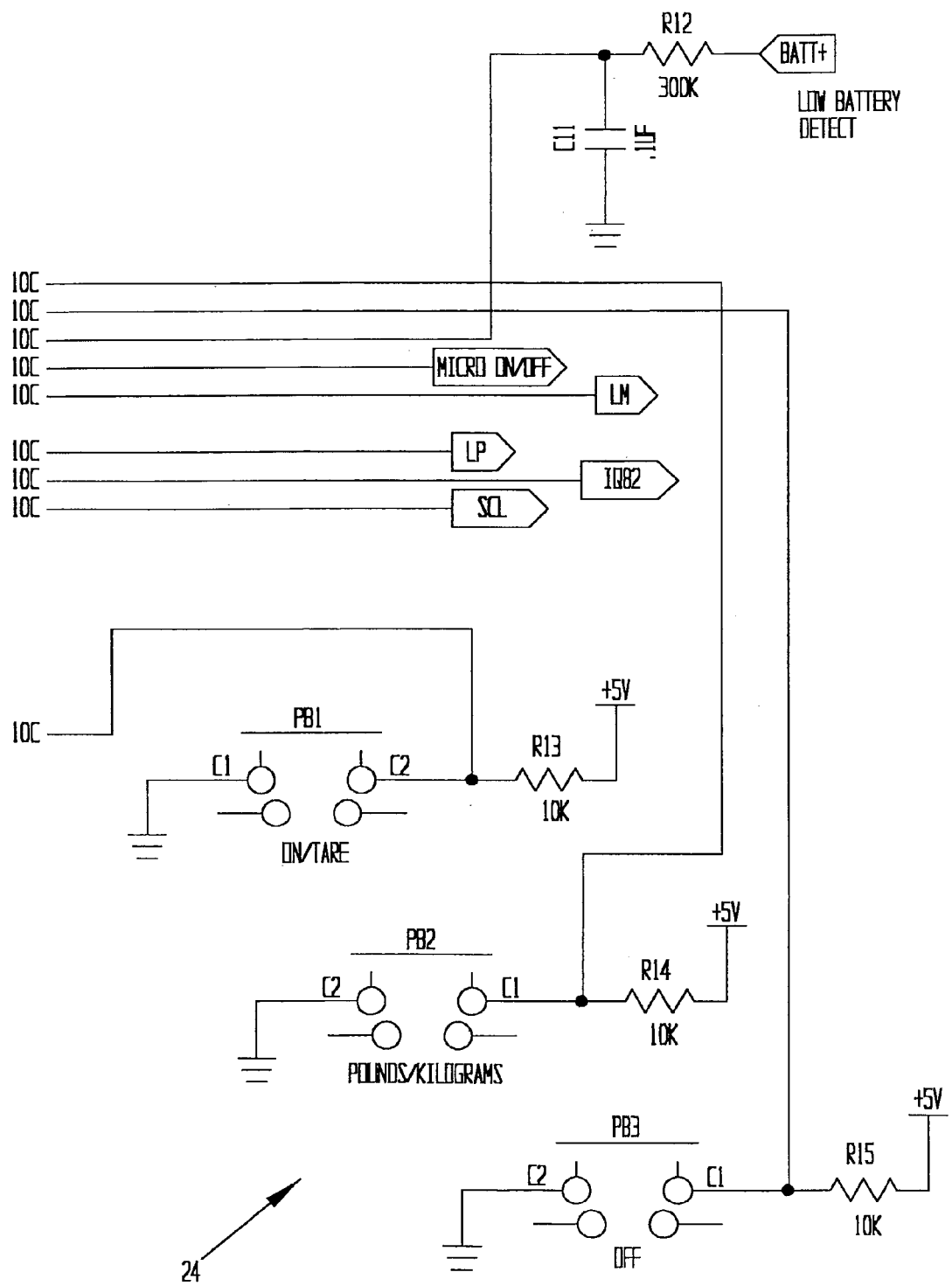
Figure 11:
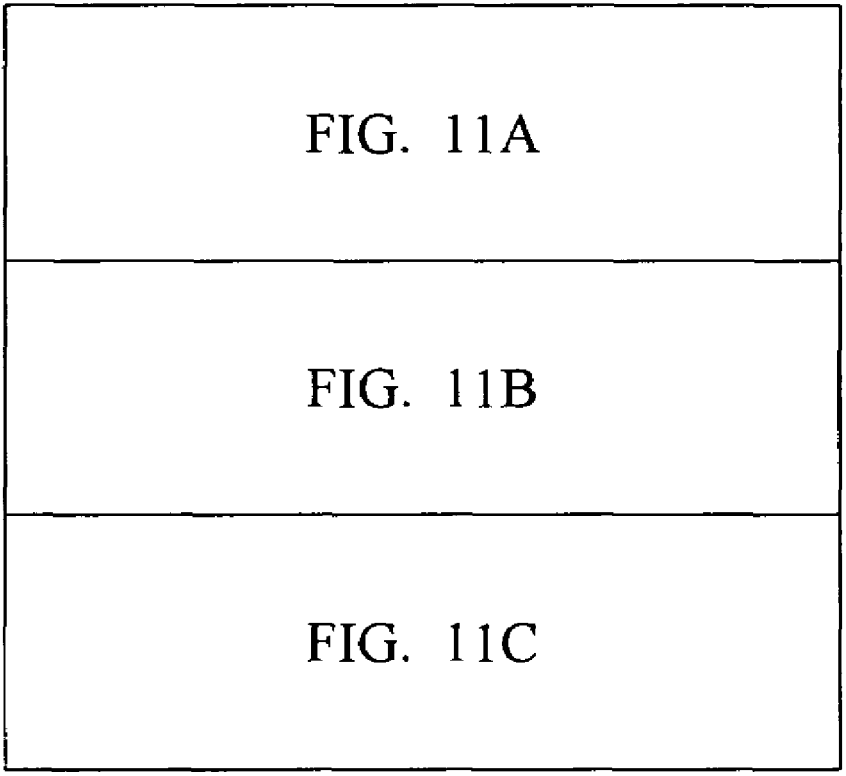
FIGS. 11a–c illustrate an electrical schematic of a display circuitry.
Figure 11A:
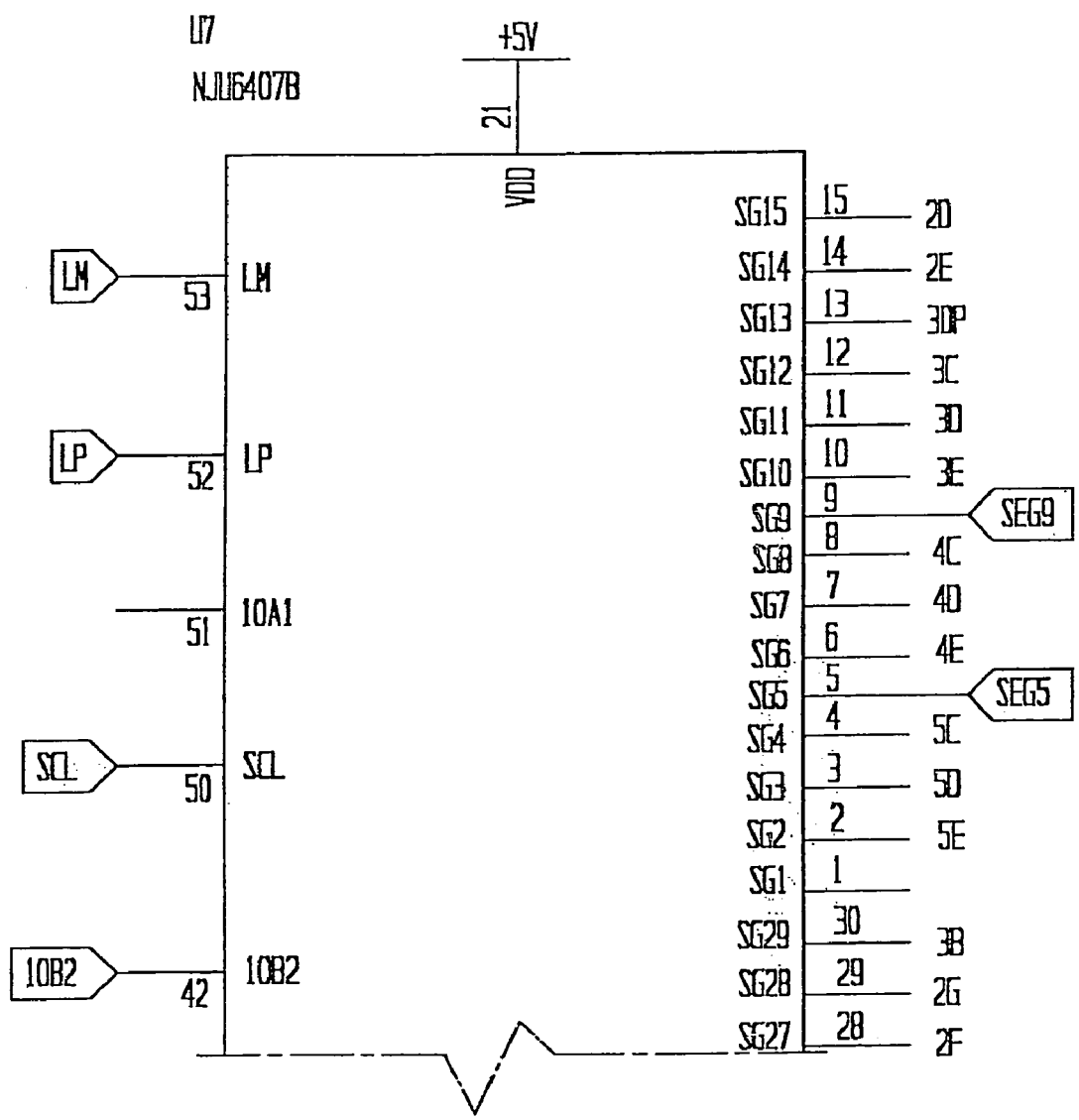
Figure 11B:
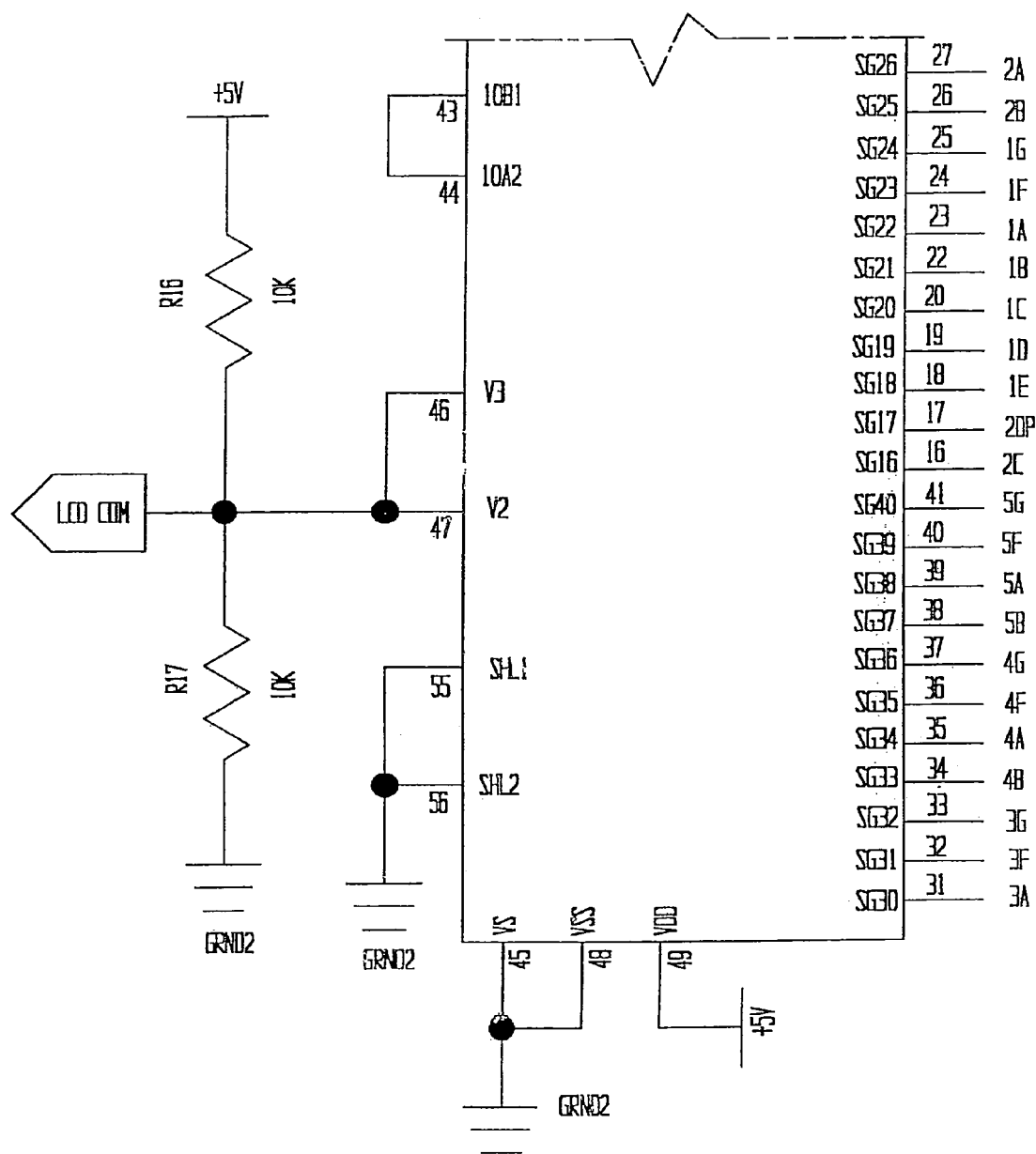
Figure 11C:
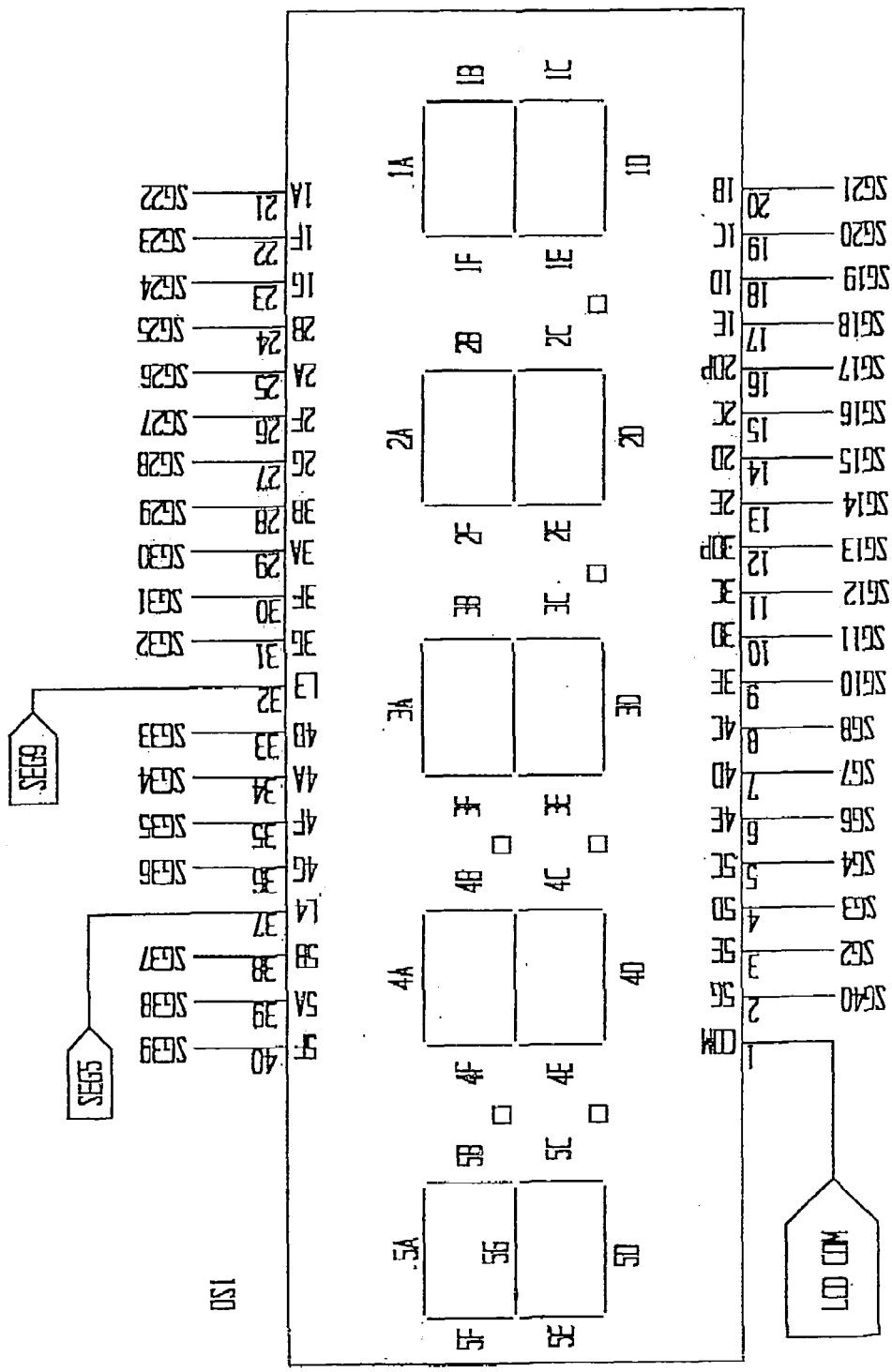

The control circuitry 14 preferably includes a strain gauge amplifier portion 18a–b and an A/D converter portion 20 adapted for converting a small voltage differential, i.e. 500 mV to 200 mV across nodes W and G in FIG. 7, caused by a deflection of the strain gauge load cell into usable digital data (0–5 V at the input of the A/D converter portion 20). The control circuitry 14 also includes a microprocessor 22 adapted for reading a container weight from the scale 12 and controlling the dispensing mechanism accordingly. A variety of controls 24 may be used to operate and program the microprocessor 22. The weight detected by the microprocessor 22 may be "zeroed" through a tare control, and the possibly multiple fill weights and foam delay times, or fill sequence, for a variety of containers may be pre-programmed. For example, the automatic portion control system may include a "top-off" feature, may be used with small, medium, large, etc. selection switches, used with an auto-dispensing apparatus and method for dispensing a substance upon detecting a container weight to indicate the container's presence. The present invention may also be used with the "Apparatus and Method for Detecting an Object Using Digitally Encoded Optical Data" described in U.S. Pat. No. 5,902,998 and U.S. patent application Ser. No. 09/289,902, herein incorporated by reference as Exhibit A and B to detect the presence of a container and the container size and to initiate dispensing. The microprocessor 22 can then be used to control the dispensing process through relays 26.

The present invention also includes a method for dispensing a product into a container, comprising the steps of weighing a container and dispensing the product into the container until reaching the estimated filled weight of the container. The method may further comprise the steps of detecting the presence of a container, detecting the type of container to determine the known empty weight and the known volume of an empty container, and/or performing a pre-programmed fill sequence. If the container contains an undetermined amount of a substance with a specific volume that is substantially different from that of the product, the step of dispensing the product into the container until reaching the estimated filled weight of the container may include the steps of subtracting the known empty weight from the current weight to determine the volume of a known substance in the container, and subtracting the volume of the substance in the container with the known volume of an empty container to determine the volume of product to dispense into the container.

The descriptions above and the accompanying materials should be interpreted in the illustrative and not the limited sense. While the invention has been disclosed in connection with the preferred embodiment or embodiments thereof, it should be understood that there may be other embodiments which fall within the scope of the invention.

What is claimed is:

1. An automatic portion control system, comprising:
   (a) a dispensing mechanism adapted for dispensing a first substance into a container;
   (b) a scale adapted for weighing said container;
   (c) control circuitry adapted for reading a container weight from said scale and controlling said dispensing mechanism accordingly;
   (d) a proximity sensor adapted for sensing the presence of a container; and
   (e) a container size sensor adapted for detecting two or more container types, each of said container types having a predetermined volume, wherein said control circuitry comprises a microprocessor adapted for reading a container weight from said scale and controlling said dispensing mechanism according to a detected container type, its known empty weight and volume, and its present weight.

2. The automatic portion control system of claim 1, wherein said container holds an undetermined volume of a second substance.

3. The automatic portion control system of claim 1, wherein said scale includes strain gauge load cells.

4. The automatic portion control system of claim 3, wherein said control circuitry comprises a strain gauge amplifier portion and an A/D converter portion adapted for converting a voltage differential caused by a deflection of said strain gauge load cell into usable digital data.

5. The automatic portion control system of claim 1, wherein said control circuitry comprises a microprocessor adapted for reading a container weight from said scale and controlling said dispensing mechanism accordingly.

6. The automatic portion control system of claim 5, further comprising controls for programming said microprocessor.

7. The automatic portion control system of claim 6, wherein said controls for programming said microprocessor are adapted for programming a fill sequence.

8. The automatic portion control system of claim 1, further comprising a tare control.

* * * * *